US012674896B2

(12) United States Patent
Talbot

(10) Patent No.: US 12,674,896 B2
(45) Date of Patent: Jul. 7, 2026

(54) METHODS AND SYSTEMS FOR FORMING TIME-DIFFERENCED NAVIGATION SATELLITE SYSTEM OBSERVABLES

(71) Applicant: Trimble Inc., Westminster, CO (US)

(72) Inventor: Nicholas Charles Talbot, Victoria (AU)

(73) Assignee: Trimble Inc., Westminster, CO (US)

( * ) Notice: Subject to any disclaimer, the term of this patent is extended or adjusted under 35 U.S.C. 154(b) by 361 days.

(21) Appl. No.: 18/241,149

(22) Filed: Aug. 31, 2023

(65) Prior Publication Data

US 2024/0168174 A1 May 23, 2024

(30) Foreign Application Priority Data

Nov. 11, 2022 (EP) ..................................... 22206935

(51) Int. Cl.
*G01S 19/43* (2010.01)
(52) U.S. Cl.
CPC ..................................... *G01S 19/43* (2013.01)
(58) Field of Classification Search
CPC ..................................................... G01S 19/43
See application file for complete search history.

(56) References Cited

U.S. PATENT DOCUMENTS

| | | | | |
|---|---|---|---|---|
| 2007/0052583 A1* | 3/2007 | Zhodzishsky | ........... | G01S 19/51 342/357.24 |
| 2011/0285587 A1 | 11/2011 | Vollath et al. | | |
| 2016/0377736 A1* | 12/2016 | Zeitzew | .................. | G01S 19/43 342/357.34 |

(Continued)

FOREIGN PATENT DOCUMENTS

| | | | | | |
|---|---|---|---|---|---|
| CN | 110988955 A | * | 4/2020 | ............. | G01S 19/49 |
| CN | 113671546 B | * | 9/2023 | ............. | G01S 19/29 |
| EP | 3 130 943 A1 | | 3/2022 | | |

(Continued)

OTHER PUBLICATIONS

Machine Translation of CN110988955A (Year: 2019).*

(Continued)

*Primary Examiner* — William Kelleher

*Assistant Examiner* — Isabella Ameyali Edrada

(74) *Attorney, Agent, or Firm* — Kilpatrick Townsend & Stockton LLP

(57) ABSTRACT

Some embodiments of the invention relate to methods carried out by a navigation satellite system (NSS) receiver for estimating parameters useful to determine a position. The NSS receiver observes NSS signals from a plurality of NSS satellites. The method comprises performing a delta-carrier-phase-observables-computation procedure. It is further determined whether a criterion, indicative of (i) continuity of carrier phase measurements from an anchor epoch to a terminus epoch, and/or (ii) stability of NSS satellite measurement geometry from the anchor epoch to the terminus epoch, is satisfied, and, if not, the anchor epoch is moved forward. Then, after determining whether the criterion is satisfied and after either moving the anchor epoch or not, the delta-carrier-phase-observables-computation procedure is performed again for a new terminus epoch. Systems and vehicles using such a method are also disclosed.

20 Claims, 20 Drawing Sheets

(56) References Cited

U.S. PATENT DOCUMENTS

2022/0073108 A1* 3/2022 Park ................ B60W 60/0051

FOREIGN PATENT DOCUMENTS

EP      3 035 080 A1      8/2022
WO      2012/151006 A1    11/2012

OTHER PUBLICATIONS

Machine Translation of CN113671546B (Year: 2021).*
Wolfe, Jonathan D.; Estimation of Relative Satellite Position Using Transformed Differential Carrier-Phase GPS Measurements (Year: 2021).*
Li, Xiukui; GNSS Repeater Based Differential Indoor Positioning With Multi-Epoch Measurements; https://ieeexplore.ieee.org/abstract/document/9573281 (Year: 2007).*
Sickle, J. V., "Two Types of Observables," GEOG 862: GPS and GNSS for Geospatial Professionals, 3 pages retrieved on Nov. 8, 2021 from https://www.e-education.psu.edu/geog862/node/1752.
Sepulveda, L. E. et al., "Optimizing a Bank of Kalman Filters for Navigation Integrity using Efficient Software Design," GNSS 2021, Proceedings of the 34th International Technical Meeting of the Satellite Division of the Institute of Navigation (ION GNSS + 2021), The Institute of Navigation, Sep. 24, 2021, pp. 2183-2200.
Gu, X. et al., "DGPS Positioning Using Carrier Phase for Precision Navigation," Published Apr. 11, 1994, Position Location and Navigation Symposium (PLANS), IEEE, pp. 410-417.
Young, R. S. et al., "Fault Detection and Exclusion Using Normalized Solution Separation and Residual Monitoring Methods," National Journal of the Institute of Navigation, vol. 50, No. 3, Fall 2003, pp. 151-169.
Jiang, Y. et al., "Optimization of Position Domain Relative RAIM for Weak Geometries," 23rd International Technical Meeting of the Satellite Division of The Institute of Navigation, Portland, OR, Sep. 21-24, 2010, pp. 2182-2189.
Zhao, Y., "Applying Time-Differenced Carrier Phase in Nondifferential GPS/IMU Tightly Coupled Navigation Systems to Improve the Positioning Performance," IEEE Transactions on Vehicular Technology, vol. 66, No. 2, Feb. 2017, pp. 992-1003.
Traugott, J. et al., "A Time-Relative Approach for Precise Positioning with a Miniaturized L1 GPS Logger," ION GNSS 21$^{st}$ International Technical Meeting of the Satellite Division, 16-19, Sep. 2008, Savannah, GA, pp. 1883-1894.
Partial European Search Report for Application No. 22206935.3-1206, mailed Apr. 18, 2023, 18 pages.
Extended European Search Report for Application No. 22206935.3-1206, mailed Jul. 12, 2023, 23 pages.

* cited by examiner s20 s20 s20 sub-criterion A AND sub-criterion C yes                    no s20 sub-criterion B AND sub-criterion C yes                    no

METHODS AND SYSTEMS FOR FORMING TIME-DIFFERENCED NAVIGATION SATELLITE SYSTEM OBSERVABLES

CROSS-REFERENCE TO RELATED APPLICATIONS

This application claims priority to European Application No. 22206935.3, filed Nov. 11, 2022, the entire contents of which are incorporated herein by reference for all purposes.

FIELD OF TECHNOLOGY

The invention relates to methods, systems, and computer programs using navigation satellite system (NSS) observations for position estimation, trajectory estimation, or for other purposes. The fields of application of the methods, systems, and computer programs include, but are not limited to, navigation, highly automated driving, autonomous driving, mapmaking, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BDS (China), QZSS (Japan), and the Indian Regional Navigational Satellite System (IRNSS, also referred to as NAVIC) (systems in use or in development). An NSS typically uses a plurality of satellites orbiting the Earth. The plurality of satellites forms a constellation of satellites. An NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS, and Galileo is provided for example in sections 9, 10, and 11 of reference [1] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors, and multipath propagation.

The carrier signals transmitted by the NSS satellites can also be tracked to provide an alternative, or complementary means of determining the range, or change in range between the receiver and satellite. Carrier phase measurements from multiple NSS satellites facilitate estimation of the position of the NSS receiver.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, has an effective chip length that is much longer than one cycle of the carrier on which the code is modulated. Code and carrier phase measurements have precisions that are roughly the same fraction of the respective chip length or wavelength. The position resolution may therefore be viewed as greater for carrier phase detection than for code detection.

However, in the process of estimating the position based on carrier phase measurements, the carrier phases are ambiguous by an unknown number of cycles. The fractional phase of a received signal can be determined but the additional number of cycles required to determine the satellite's range cannot be directly determined in an unambiguous manner. This is the so-called "integer ambiguity problem", "integer ambiguity resolution problem", or "phase ambiguity resolution problem", which may be solved to yield the so-called fixed-ambiguity solution (sometimes referred to simply as the fixed solution).

GNSS observation equations for code observations and for carrier phase observations are for instance provided in reference [1], section 5. An introduction to the GNSS integer ambiguity resolution problem, and its conventional solutions, is provided in reference [1], section 7.2. The person skilled in the art will recognize that the same or similar principles apply to RNSS.

The main GNSS observables are therefore the carrier phase and code (pseudorange), the former being generally much more precise than the latter, but ambiguous. These observables enable a user to obtain the geometric distance from the receiver to the satellite. With known satellite position and satellite clock error, the receiver position and receiver clock error can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequencies is modulated with a pseudo-random noise (PRN) code, and optionally with satellite navigation data. When GNSS satellites broadcast signals that do not contain navigation data, these signals are sometimes termed "pilot" signals, or "data-free" signals. In relation to GPS, two different PRN codes are transmitted by each satellite: a C/A code and a P code which is encrypted for DoD-authorized users to become a Y code. Each C/A code is a unique sequence of 1023 bits, which is repeated each millisecond. Other NSS systems also have satellites transmitting multiple signals on multiple carrier frequencies.

Furthermore, the forming of time-differenced carrier phase observables and the processing thereof, said processing being also referred to as "delta phase" processing, are known in the art for precise position propagation to the current epoch. The basic delta phase processing principles are explained for example in reference [2], pp. 11-13, paragraphs [0035] to [0047]. Namely, "[i]f carrier phase tracking is maintained, the delta phase measurements give a precise measure of the change in range (distance) between user and satellite over time" (ibid., p. 11, paragraph [0036]). The precise measure of the change in range notably stems from the fact that, in the delta phase observation equation, the carrier phase ambiguity term cancels out (ibid., p. 12, paragraphs [0044] and [0045]).

There is a constant need for improving the implementation of positioning or similar systems making use of NSS observables, and, in particular, systems in which time-differenced carrier phase observables, also called "delta carrier phase observables" or "delta-carrier-phase observables", are formed and then used for estimating trajectories or for other purposes.

SUMMARY

The present invention aims at addressing the above-mentioned need. The invention includes methods, systems, computer programs, computer program products, and storage mediums as defined in the independent claims. Particular embodiments are defined in the dependent claims.

In one embodiment, a method is carried out by at least one of a navigation satellite system receiver, hereinafter abbreviated as "NSS receiver", and a processing entity capable of receiving data from the NSS receiver, for estimating parameters useful to, i.e. suitable to, determine a position. The NSS receiver observes NSS signals from a plurality of NSS satellites. Hereinafter, a procedure comprising computing time-differenced carrier phase observables by subtracting carrier phase observables of an epoch m from carrier phase observables of a subsequent epoch n is referred to, for the sake of conciseness, as "delta-carrier-phase-observables-computation procedure$_{m,n}$". Further, hereinafter, u is a measurement update interval. The method comprises the following steps and/or operations: Delta-carrier-phase-observables-computation procedure$_{a,b}$ is performed. It is determined whether a criterion, which is indicative of at least one of (i) continuity of carrier phase measurements from epoch a to epoch b+u, and (ii) stability of NSS satellite measurement geometry from epoch a to epoch b+u, is satisfied, and, if the criterion is not satisfied, the value of a is increased. Then, i.e. after determining whether the criterion is satisfied and after either increasing the value of a or not, delta-carrier-phase-observables-computation procedure$_{a,b+u}$ is performed.

The forming of time-differenced navigation satellite system observables as described above has been found to generally provide, for example compared to some reference methods (which are described below), better results in terms of limiting propagation error accumulation and/or maximizing solution accuracy overall.

In one embodiment, a system comprises at least one of: a NSS receiver, and a processing entity capable of receiving data from the NSS receiver, the system being for estimating parameters useful to, i.e. suitable to, determine a position, the NSS receiver being configured for observing NSS signals from a plurality of NSS satellites, and the system being configured for carrying out the above-described method. In one embodiment, a vehicle comprises such a system.

In some embodiments, computer programs, computer program products and storage media for storing such computer programs are provided. Such computer programs comprise computer-executable instructions configured for carrying out, when executed on a computer such as one embedded in, or otherwise part of, a NSS receiver or in another apparatus, or when executed on a set of computers such as a set of computers embedded in, or otherwise part of, a set of apparatuses, the above-described method.

BRIEF DESCRIPTION OF THE DRAWINGS

Embodiments of the present invention shall now be described in conjunction with the appended drawings in which.

DETAILED DESCRIPTION

Figure 1:
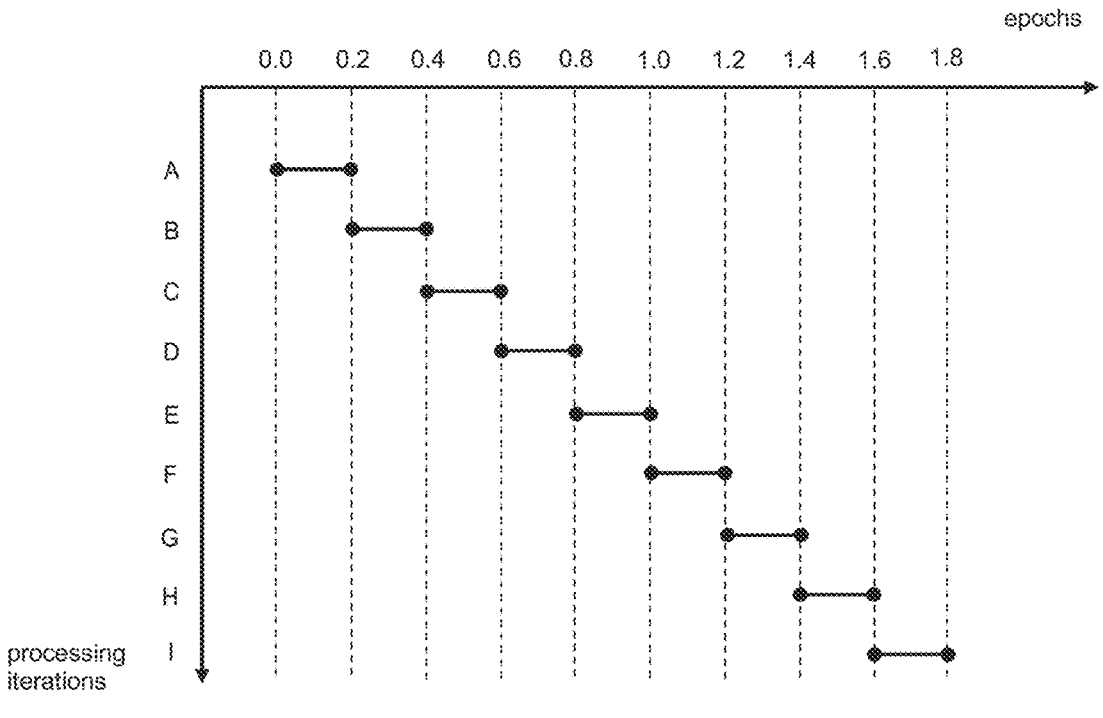
FIG. 1 schematically illustrates an example of realization of a non-claimed, non-public reference implementation, referred to as "stepwise processing reference implementation", for illustrating the context in which some embodiments of the invention have been developed.

The present invention shall now be described in conjunction with specific embodiments. These serve to provide the skilled person with a better understanding but are not intended to in any way restrict the scope of the invention, which is defined by the appended claims. In particular, the embodiments described throughout the description can be combined to form further embodiments to the extent that they are not mutually exclusive.

Throughout the following description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced with "RNSS" to form additional embodiments.

In the art, the term "observables" is often used to refer to structures of an NSS signal from which observations or measurements can be made (PRN-code, carrier phase) (see e.g. reference [3]: "The word observable is used throughout GPS literature to indicate the signals whose measurement yields the range or distance between the satellite and the receiver."). However, in common usage, and in the present document, the term "observable" (also referred to as "NSS observable") is also interchangeably used to refer to the observation itself, such that, for example, "carrier phase observable" has the same meaning as "carrier phase observation". Further, when the present document describes that an NSS signal is observed, this means that at least an observation (measurement) of at least an observable of the NSS signal is made. By extension, in the present document, terms such as "delta carrier phase observables" (also referred to as "time-differenced carrier phase observables") are also sometimes used although delta carrier phase observables are strictly speaking not directly observed but constructed, i.e. formed by computation, based on observables.

When the term "real-time" is used in the present document, it means that there is an action (e.g., data is processed, results are computed) as soon as the required information for that action is available. Thus, certain latency exists, which depends on various aspects depending on the involved component(s) of the system.

When the verb "broadcast" (and "broadcasting", etc.) is used, this also covers embodiments where the transmission is a form of multicasting.

The forming and processing of delta-carrier-phase observables, sometimes referred to simply as "delta phase" processing, is an effective approach for low-latency, precise position propagation to the current epoch. Specifically, the processing of delta-carrier-phase observables, some forms of which are known in the art, is beneficial in that the integer ambiguities in the carrier phases are cancelled out (as explained above with reference to reference [2]) during observation differencing so that a trajectory can be computed without the need to resolve ambiguities.

In a non-claimed, non-public reference implementation, hereinafter referred to as "stepwise processing reference implementation", the processing of delta-carrier-phase observables may go through the following steps:

(step 1) Computing delta-carrier-phase observables by differencing previous-epoch and current-epoch observables. This computation may be expressed mathematically as follows:

$$deltacarrierphase(t_k) = carrierphase(t_k) - carrierphase(t_{k-1})$$

where:

$t_k$ is the current epoch;

6

$t_{k-1}$ is the previous epoch; and carrierphase($t_i$) is the carrier phase observation at epoch $t_i$.

Besides, the carrier phase measurement in meters can be expressed as follows:

$$carrierphase(t) =$$
$$range(t) + tropo(t) - iono(t) + rcvclock(t) + \lambda * N + noise(t)$$

where:

the sign * denotes a multiplication;

range(t) is the satellite-to-receiver distance taking the satellite clock into account;

tropo(t) and iono(t) are the troposphere and ionosphere delays, respectively;

rcvclock(t) accounts for the receiver clock;

noise(t) accounts for the observation noise and multipath errors;

$\lambda$ is the wavelength of the carrier phase observable under consideration; and N is an integer value (a so-called integer ambiguity), which remains constant unless a cycle slip or loss-of-lock occurs.

As can be seen from the above, when computing deltacarrierphase($t_k$), unknown value N cancels out. Atmospheric effects are highly correlated in time. Thus, tropo($t_k$)−tropo($t_{k-1}$) and iono($t_k$)−iono($t_{k-1}$) are expected to be very small. The remaining parts are rcvclock($t_k$)−rcvclock($t_{k-1}$) and the actual change in receiver position, or more precisely the actual change in receiver's antenna position (as also expressed for example in reference [2], p. 13, paragraph [0047]), provided that, as a skilled person would understand, the change in satellite geometry is properly compensated for by using available satellite ephemeris and satellite clock estimates.

(step 2) Processing the data in e.g. a Kalman filter to compute the position increment between two epochs.

(step 3) Accumulating small position increments into a precise position trajectory. This accumulation may be expressed mathematically as follows:

$$deltaposition(t_k, t_m) = \sum_{i=k+1}^{i=m} deltaposition(t_i)$$

where:

deltaposition($t_i$) is a computed position increment between epochs $t_{i-1}$ and $t_i$; and deltaposition($t_k$, $t_m$) is a resultant position increment for the time interval between $t_k$ and $t_m$.

(step 4) The computed precise trajectory can then be used for precise position propagation. This may be expressed mathematically as follows:

$$position(t_m) = position(t_k) + deltaposition(t_k, t_m)$$

where position($t_k$) is the position computed for time $t_k$; and position($t_m$) is the position for time $t_m$.

In the above-described stepwise processing reference implementation, a stepwise processing schedule is used to form delta-carrier-phase observables and to generate corresponding delta-position estimates. Namely, the delta-carrier-phase observables are computed by subtracting carrier phase observables of an epoch, also hereinafter referred to as "anchor epoch", from carrier phase observables of the next epoch, also hereinafter referred to as "terminus epoch", and the anchor epoch is incremented at each processing epoch. The difference between the anchor epoch and the terminus epoch, which is hereinafter referred to as the "delta-phase interval", is at each processing epoch equal to the measurement update interval.

An example of realization of the stepwise processing reference implementation is schematically illustrated in FIG. 1, in which the horizontal axis represents the receiver epochs (i.e., 0.0 second ("second" being hereinafter abbreviated "s"), 0.2 s, 0.4 s, 0.6 s, etc.), the vertical axis represents the processing iterations (i.e., A, B, C, D, etc.), and the measurement update interval is 0.2 s. In processing iteration A, delta-carrier-phase observables are formed by subtracting carrier phase observables of anchor epoch 0.0 from carrier phase observables of the next epoch, i.e. terminus epoch 0.2 s. Then, in processing iteration B, for the next terminus epoch, i.e. for epoch 0.4 s, the anchor epoch is incremented to become epoch 0.2 s, and delta-carrier-phase observables are formed based on anchor epoch 0.2 s and terminus epoch 0.4 s. Then, likewise, in processing iteration C, for the next terminus epoch, i.e. for epoch 0.6 s, the anchor epoch is incremented to become epoch 0.4 s, and delta-carrier-phase observables are formed based on anchor epoch 0.4 s and terminus epoch 0.6 s. And so on. The couples (anchor epoch, terminus epoch) used to form the delta-carrier-phase observables are therefore sequentially: (0.0 s, 0.2 s), (0.2 s, 0.4 s), (0.4 s, 0.6 s), (0.6 s, 0.8 s), (0.8 s, 1.0 s), (1.0 s, 1.2 s), (1.2 s, 1.4 s), (1.4 s, 1.6 s), (1.6 s, 1.8 s), etc.

The stepwise processing reference implementation generally maximizes the likelihood of being able to produce delta-position solutions at each epoch. However, a downside of the stepwise processing approach is that it tends to be inaccurate when accumulating delta-position estimates over time. The reasons underlying this may be explained as follows. Random carrier phase measurement noise causes corresponding errors in the delta-position estimates. Generally, delta-phase measurement noise is constant, irrespective of the measurement update interval. Let's now assume that delta-positions for (0.0 s, 0.2 s), (0.2 s, 0.4 s), . . . and (0.8 s, 1.0 s) are computed. Let var be the variance introduced into each of these delta-position estimates. Summing the delta-positions from 0.0 to 1.0 s yields the total change in position over this time interval. The variance of this summation will be 5*var (i.e., five times var). If, rather than forming delta positions in a stepwise fashion, the delta-phase measurements (0.0 s, 1.0 s) were directly formed to yield a direct estimate of the delta-position from 0.0 to 1.0 s, the variance of the delta-position in this approach would simply be var. This explains, in a simplified manner, the reasons underlying this downside of the stepwise processing approach.

Further, when the delta-phase interval is short, ramp-like errors present on the underlying phase observations are often difficult to detect. This may be explained as follows. Often pull-in effects in the carrier phase tracking loops are experienced as signals are just lost, or just gained because of signal obstructions. The pull-in effect occurs as the NSS receiver tracking loop drives the numerically controlled oscillator (NCO) so that the incoming signal and locally generated carrier are brought into alignment. The phase error is due to the slewing process. Pull-in errors tend to occur over say a fraction of a second, up to 1 s.

Another phenomenon that occasionally occurs is a distortion of the received carrier signal because of diffraction or multipath. The error tends to either increase or decrease over some seconds, or even tens of seconds for a stationary antenna.

Now let's imagine we have multiple satellite signals that suffer from the aforementioned effects and that the errors each look like a ramp-like error, with a rate of say 2 cm per second. With a delta-phase interval of 0.1 s, the ramp-like error will equate to 2 cm*0.1=2 mm. If the delta-phase measurement noise is also assumed to be 2 mm, then the ramp-like error will be difficult to distinguish from measurement noise.

In order to detect the ramp-like error, it is desirable that the delta-phase interval be significantly greater than the measurement noise. If the ramp-like error is not detected, the delta-position estimates may drift off over time, particularly in situations where satellite geometry is poor, such as urban or downtown environments.

If a 1-second epoch interval were used to process the data, the 2 cm ramp-like error would be much more evident amongst remaining delta-phase measurements, having 2 mm noise. Generally, if the delta-phase interval is smaller than 1 second, ramp-like errors can be difficult to identify and isolate. But when the NSS receiver is stationary, even longer delta-phase intervals may be desirable to identify and isolate a slow drift in carrier phase measurements.

In another non-claimed, non-public reference implementation, hereinafter referred to as "preset anchor epoch reference implementation", the anchor epoch is updated at a fixed rate, the update rate corresponding to a multiple of the measurement update interval. The time interval at which the anchor epoch is updated is hereinafter referred to as "anchor epoch update interval", and is fixed, i.e. preset, in the preset anchor epoch reference implementation. For example, the measurement update interval may be 0.2 s and the anchor epoch may be updated every second. In this example, the anchor epoch update interval is 1.0 s.

An example of realization of the preset anchor epoch reference implementation is schematically illustrated in FIG. 2, in which, again, the horizontal axis represents the receiver epochs, the vertical axis represents the processing iterations, and the measurement update interval is 0.2 s, and in which the anchor epoch update interval is 1.0 s. In processing iteration A, delta-carrier-phase observables are formed by subtracting carrier phase observables of anchor epoch 0.0 from carrier phase observables of the next epoch, i.e. terminus epoch 0.2 s. Then, in processing iteration B, for the next terminus epoch, i.e. for epoch 0.4 s, the anchor epoch is not increased, so that delta-carrier-phase observables are formed based on anchor epoch 0.0 s and terminus epoch 0.4 s. Then, in processing iterations C, D, and E, the anchor epoch is not increased either, and, in processing iteration F, when terminus epoch becomes larger than 1.0 s, i.e. when terminus epoch becomes epoch 1.2 s, the anchor epoch is increased, i.e. updated, to become epoch 1.0 s. Then, in processing iterations G, H, I, and J, the anchor epoch is not increased, and in processing iteration K, when terminus epoch becomes larger than 2.0 s, i.e. when terminus epoch becomes epoch 2.2 s, the anchor epoch is increased to become epoch 2.0 s. And so on. The couples (anchor epoch, terminus epoch) used to form the delta-carrier-phase observables are therefore sequentially: (0.0 s, 0.2 s), (0.0 s, 0.4 s), (0.0 s, 0.6 s), (0.0 s, 0.8 s), (0.0 s, 1.0 s), (1.0 s, 1.2 s), (1.0 s, 1.4 s), (1.0 s, 1.6 s), (1.0 s, 1.8 s), (1.0 s, 2.0 s), (2.0 s, 2.2 s), etc.

The preset anchor epoch reference implementation may also suffer from error accumulation if the anchor epoch update interval is short, such as smaller than or equal to 1.0 s (see explanations provided above in relation to the stepwise processing reference implementation). Another potential downside of the preset anchor epoch approach is that the longer the anchor epoch update interval, the longer the delta-phase interval will be at some point in time, and the larger the likelihood that satellite carrier phase observations tracked at the anchor epoch will no longer be tracked at the terminus epoch. Delta carrier phase observables generally require continuity of carrier phase measurements between the current time and the anchor epoch in order to form a valid delta carrier phase observable.

Figure 2:
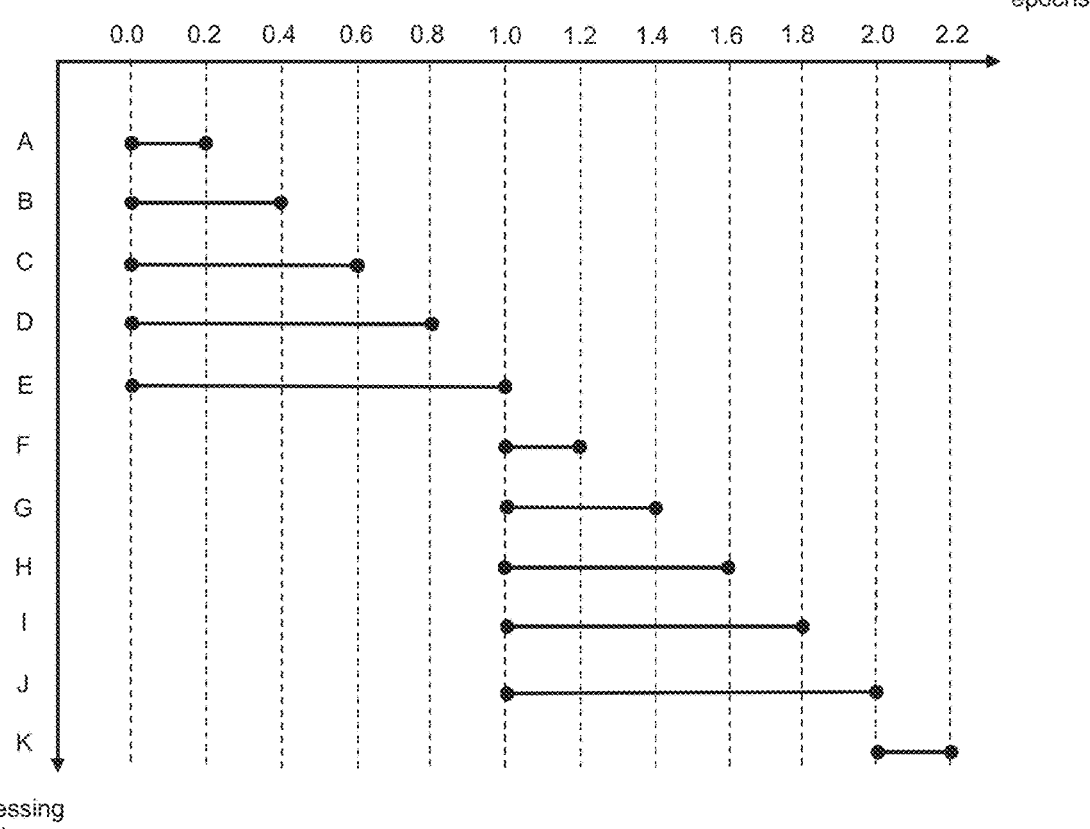
FIG. 2 schematically illustrates an example of realization of another non-claimed, non-public reference implementation, referred to as "preset anchor epoch reference implementation", also for illustrating the context in which some embodiments of the invention have been developed.

Some embodiments of the invention have been developed in the light of the above considerations and drawbacks discussed with reference to FIGS. 1 and 2, and more generally with reference to the stepwise processing reference implementation and preset anchor epoch reference implementation. In particular, some embodiments of the invention involve forming time-differenced carrier phase observables (also called delta carrier phase observables) with the ability, in effect, to automatically adjust the anchor epoch update interval in order to maintain continuity of delta-position estimates and to minimise error accumulation in the delta-position estimates. Some embodiments of the invention aim at improving the accuracy with which highly latent (i.e., larger than 30 s old) precise positions can be propagated to the current time.

Figure 3A:
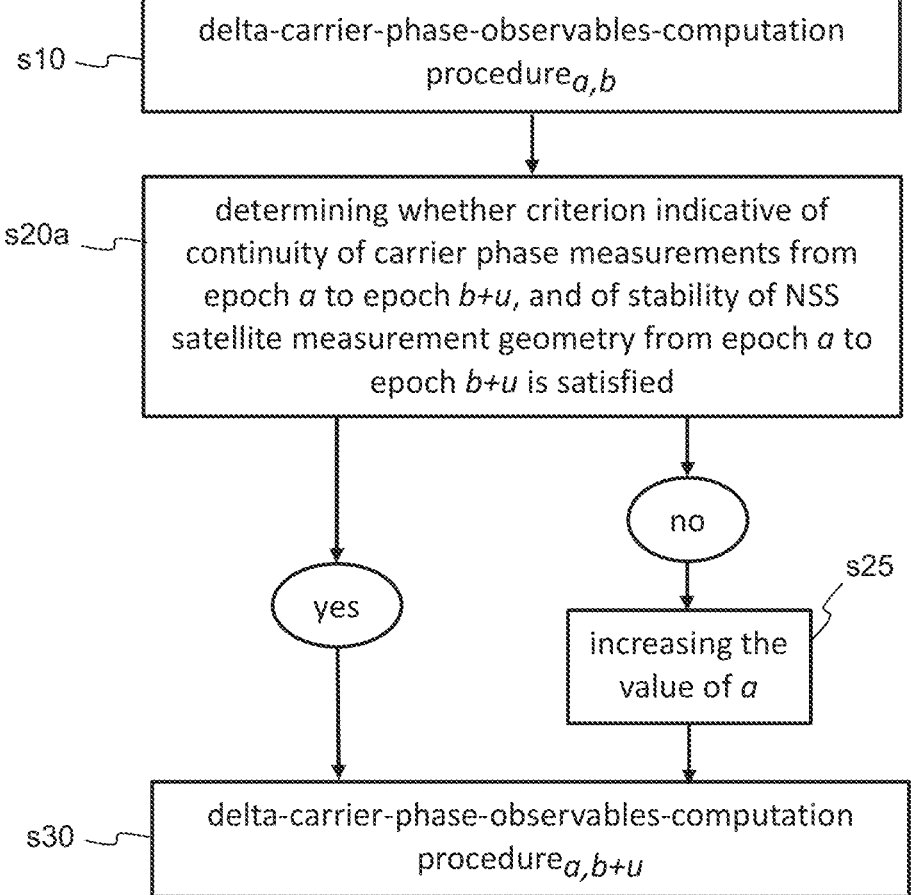
FIGS. 3a, 3b, and 3c are flowcharts of methods in three embodiments of the invention, respectively.

FIG. 3a is a flowchart of a method in one embodiment of the invention. The method may be carried out by a NSS receiver configured for observing NSS signals from a plurality of NSS satellites over multiple epochs, by another processing entity capable of receiving data from the NSS receiver, or by an NSS receiver in conjunction with such other processing entity (i.e., by an NSS receiver and another processing entity). The processing entity may be remotely located from the NSS receiver and may for example receive data representing the NSS observations from the NSS receiver.

In one embodiment, the method aims at estimating parameters derived from NSS signals useful to, i.e. suitable to, determine a position, such as the position of a rover receiver (also called "rover system" or simply "rover") or of a reference station. The method may eventually lead to estimating a rover position or reference station position. In one embodiment, the position is a position relative to a reference point or initial point, whose absolute position need not necessarily be precisely known, and the method may aim at estimating a trajectory relative to the reference point or initial point.

The estimated parameters may for example indicate the most probable number of carrier cycles along the distance separating an NSS satellite from the NSS receiver, i.e. the estimated parameters may be the resolved integer ambiguity (although this is not necessary, as explained below). This also means that the method may estimate the position itself but not necessarily: parameters may be estimated that may be used, for example by another entity (such as a processing entity on a server dedicated to such task), to estimate or determine the position of the NSS receiver (e.g., a rover receiver) or of a reference station. Furthermore, other parameters such as, for example, properties of the ionosphere may be estimated. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Doing so is useful for example for generating a correction stream to be broadcasted to users (see e.g. references [4] and [5]).

Yet furthermore, beyond determining the position of a rover or a reference station, if the position of NSS receivers (such as reference stations) is known, solving the integer ambiguities in the carrier phases by solving observation equations may also be used to eventually estimate the position of a satellite.

However, in some embodiments, it is unnecessary to solve the integer ambiguities in the carrier phases because processing the delta-carrier-phase observables cancels out the integer ambiguities as explained above. Thus, in these embodiments, the parameters estimated by the method may instead be parameters representing a change in the NSS receiver position based on which a trajectory, i.e. a relative position over time, can be derived.

The application relying on NSS observations to produce an estimate of said parameters, or a combination thereof, may for example be a highly automated driving or autonomous driving application relying on NSS observations to produce an estimate of the position, velocity, or acceleration of a vehicle.

In the present document, for example when describing the embodiment of FIG. 3a and other embodiments too, performing a procedure referred to, for the sake of conciseness, as "delta-carrier-phase-observables-computation procedure$_{m,n}$," will be discussed. The procedure comprises computing time-differenced carrier phase observables (also called delta carrier phase observables) by subtracting carrier phase observables of an epoch m (i.e., observed at an epoch m) from carrier phase observables of a subsequent epoch n (i.e., observed at an epoch n). Variables m and n are numbers, such as real numbers or integers, which refer respectively to the anchor epoch and the terminus epoch based on which the time-differenced carrier phase observables are computed in delta-carrier-phase-observables-computation procedure$_{m,n}$. Further, in the present document, variables m and n are sometimes replaced by other indices, such as a and b respectively, or a and b+u respectively. The meaning of these indices is similar to that of indices m and n as discussed above. Namely, indices a and b in the expression "delta-carrier-phase-observables-computation procedure$_{a,b}$" refer respectively to the anchor epoch and the terminus epoch based on which the time-differenced carrier phase observables are computed in delta-carrier-phase-observables-computation procedure$_{a,b}$, and indices a and b+u in the expression "delta-carrier-phase-observables-computation procedure$_{a,b+u}$" refer respectively to the anchor epoch and the terminus epoch based on which the time-differenced carrier phase observables are computed in delta-carrier-phase-observables-computation procedure$_{a,b+u}$.

Further, in the definition of delta-carrier-phase-observables-computation procedure$_{m,n}$, the term "subsequent" means, in one embodiment, "following in time". In another embodiment, the term means "following in order" with the epochs being ordered in reverse time and the method being performed at least partially in a post-processing manner (see discussion of the reverse-time, post-processing embodiment below).

In the present document, the value u refers to a measurement update interval. In one embodiment, the method is performed at the receiver epoch rate so that the measurement update interval is equal to the time interval between two successive receiver epochs. In another embodiment, the method is performed at a lower rate than the receiver epoch rate, which means computing the delta-carrier-phase observables at a lower rate than the receiver epoch rate, and this also means that the measurement update interval is a multiple of the time interval between two receiver epochs. In such a case, this may mean that the method does not use all the data collected at the NSS receiver. In one embodiment, the method is performed at a lower rate than the receiver epoch rate depending on a condition, such as a condition depending on the number of available satellites ("available" means here available from the perspective of the NSS receiver, i.e. satellites from which the NSS receiver can receive NSS signals). For example, the method may be configured to be performed at a lower rate than the receiver epoch rate if the number of available satellites is 6 or larger than 6. In another example, with a highly-inertial systems (e.g., a car or an airplane) and with high update rate (e.g., 100 Hz), the method may for example be performed at 10 Hz. In other words, the value of the measurement update interval may be adjusted depending on various pieces of information indicative of, for example, the state of the NSS or the state of the NSS receiver.

Measurement update interval u may, in one embodiment, have a value that is larger than, or equal to, 0.1 second and smaller than, or equal to, 10 seconds, or, in one embodiment, a value that is larger than, or equal to, 0.1 second and smaller than, or equal to, 2 seconds, or, in a further embodiment, a value that is larger than, or equal to, 0.15 second and smaller than, or equal to, 0.5 second. A large value for measurement update interval u may increase the likelihood that satellite carrier phase observations tracked at the anchor epoch might no longer be tracked even initially at the end of measurement update interval u, i.e. at the terminus epoch. A small value for measurement update interval u increases the computation load in view of the larger number of delta-position estimates to be generated. A value for measurement update interval u that is larger than, or equal to, 0.15 second and smaller than, or equal to, 0.5 second may represent a preferable trade-off between these two aspects. However, as clear from the above, the invention is not limited to any specific measurement update interval u.

In step s10, delta-carrier-phase-observables-computation procedure$_{a,b}$ is performed. In other words, time-differenced observables, i.e. delta observables, are computed by differencing NSS observables observed by the NSS receiver at terminus epoch b and observables observed by the NSS receiver at anchor epoch a preceding terminus epoch b, and the observables comprise at least carrier phase observables. In step s10, the delta-phase interval, which is, as mentioned above, the difference between the anchor epoch and the terminus epoch, i.e. b minus a, may be equal to measurement update interval u or to a multiple of measurement update interval u.

In step s20a, it is determined whether a criterion indicative of continuity of carrier phase measurements from epoch a to epoch b+u, and of stability of NSS satellite measurement geometry from epoch a to epoch b+u is satisfied.

Continuity of carrier phase measurements from epoch a to epoch b+u is a measure of an extent to which the carrier phase measurements observed at epoch a can be continuously tracked from epoch a to epoch b+u. This may be expressed as a number of continuously tracked carrier phase observables or by means of any other suitable metric. For example, continuity of carrier phase measurements may be degraded if one or more of the NSS satellites available at anchor epoch a are no longer available at terminus epoch b+u. A NSS satellite may have become unavailable for example after having moved beyond the horizon, or if it is obstructed by an obstacle (a tree, a bridge, a building, etc.), so that the NSS receiver can no longer observe its NSS signal(s).

Stability of NSS satellite measurement geometry from epoch a to epoch b+u is a measure of a level of absence of change in the position of the NSS satellites from which the NSS receiver obtains carrier phase measurements, from the perspective of the NSS receiver's position, from epoch a to epoch b+u. For example, the stability of NSS satellite measurement geometry may substantially change if the NSS satellites available at terminus epoch b+u becomes geometrically much more distributed in the sky (as viewed from the NSS receiver) in such a way that an achievable precision of carrier phase measurements is substantially reduced (compared to the achievable precision at anchor epoch a), or, conversely, if the NSS satellites available at the terminus epoch b+u becomes geometrically much less distributed in the sky (as viewed from the NSS receiver) in such a way that an achievable precision of carrier phase measurements is substantially increased (compared to the achievable precision at anchor epoch a). A suitable measure may for example be a geometric dilution of precision (GDOP) metric (regarding the meaning of the term "dilution of precision", see e.g. reference [1], pp. 262-266, section 7.3.4). Any other suitable measure may be used, however. Other suitable measures may for example be based on the number of available satellites and/or the total number of available measurements (satellite frequency bands).

Figures 3B, 3C:
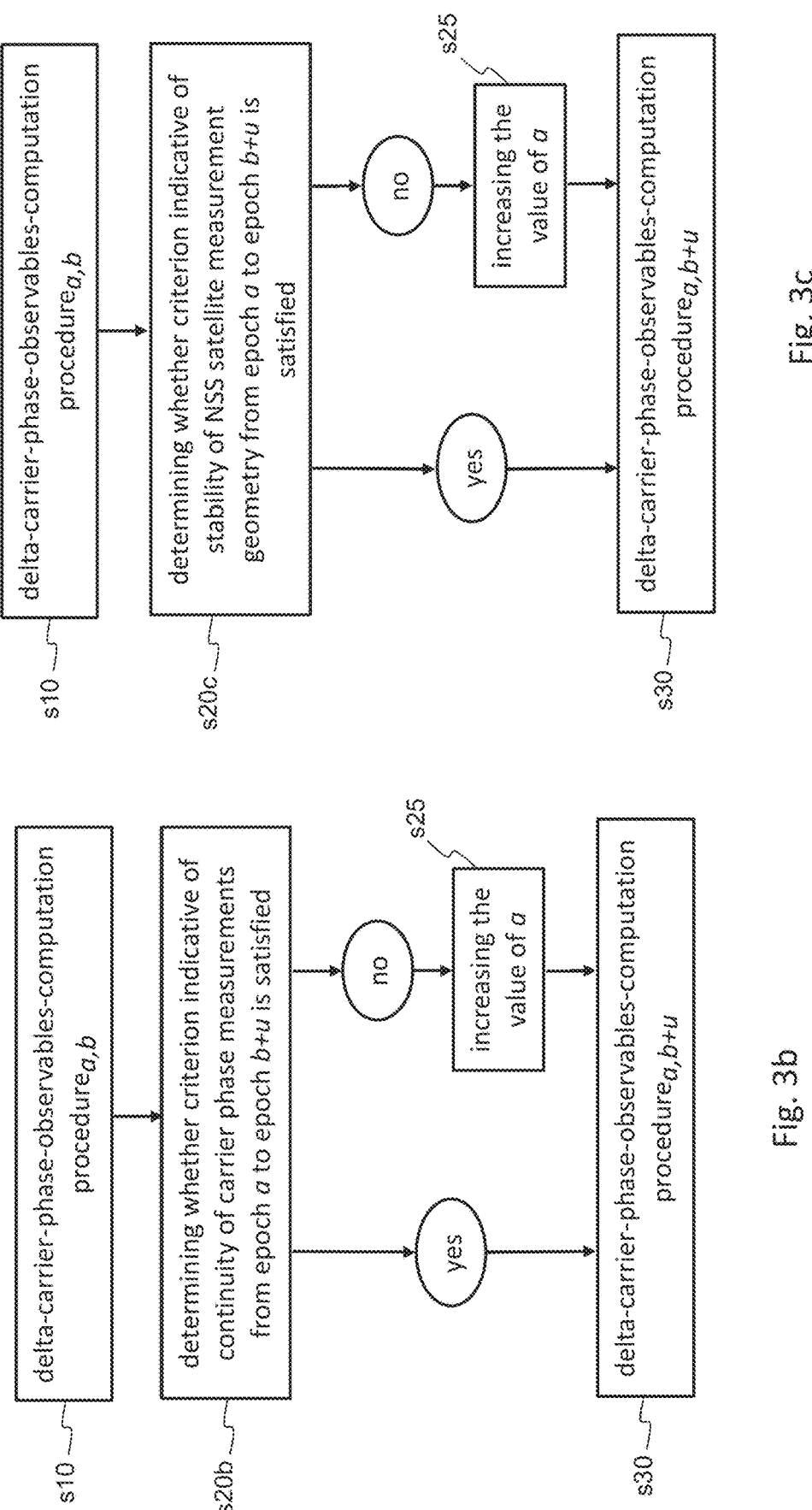

In the embodiment illustrated in FIG. 3a, the criterion tested in step s20a is indicative of both a continuity of carrier phase measurements from epoch a to epoch b+u, and a stability of NSS satellite measurement geometry from epoch a to epoch b+u. However, it is also possible to test a criterion indicative of one of the two aspects. For example, the method may be modified as shown in the embodiment of the method as illustrated in FIG. 3b, wherein step s20a is replaced with step s20b. In step s20b, it is determined whether a criterion indicative of continuity of carrier phase measurements from anchor epoch a to terminus epoch b+u is satisfied. In another example, the method may be modified as shown in the embodiment of the method as illustrated in FIG. 3c, wherein step s20a is replaced with step s20c. In step s20c, it is determined whether a criterion indicative of stability of NSS satellite measurement geometry from anchor epoch a to terminus epoch b+u is satisfied. While the combined determination of both continuity and stability in step s20a is an advantageous embodiment, a skilled person would recognize that the partial determination of step s20b (continuity) or of step s20c (stability) may be performed with lower computational effort while still providing some substantial benefits over the prior art.

Steps s10, s25, and s30 of the embodiments illustrated in FIGS. 3a, 3b, and 3c, respectively, are identical, and the description of steps s10, s25, and s30 applies equally to these embodiments.

If it is determined in step s20a, s20b, or s20c (steps s20a, s20b, and s20c being hereinafter sometimes referred to collectively and individually as simply "step s20" for the sake of conciseness) that the criterion is not satisfied, the method proceeds to step s25. In step s25, the value of a is increased. That is, the value of the anchor epoch is changed to a higher value. In other words, the anchor epoch is moved forward. For example, anchor epoch a may be increased to a value corresponding to a time for which a criterion indicative of continuity of carrier phase measurements from new anchor epoch a to terminus epoch b+u is satisfied. In another example, anchor epoch a may be increased to a value corresponding to a time for which a criterion indicative of stability of NSS satellite measurement geometry from new anchor epoch a to terminus epoch b+u is satisfied. The new value of anchor epoch a may, for example, be value b, b−1, or b−2, although the invention is not limited to these examples.

In other words, the anchor epoch is moved forward in step s25, but not necessarily to epoch b. In this case (i.e., if the anchor epoch is moved forward in step s25 to epoch b−1, b−2, or b minus another value), rather than just storing the last epoch (epoch b) of phase measurements, an n-epoch buffer of phase measurements may be created, so that it is possible to go back to the "best" anchor time some time in the n-epoch past.

The method proceeds to step s30 either after the value of a has been increased in step s25 or after determining in step s20 that the criterion was satisfied. In step s30, delta-carrier-phase-observables-computation procedure$_{a,b+u}$ is performed.

Testing the continuity of carrier phase measurements from anchor epoch a to terminus epoch b+u, and/or the stability of NSS satellite measurement geometry from anchor epoch a to terminus epoch b+u (i.e., steps s20a, s20b, or s20c), on the one hand, and increasing the value of anchor epoch a (step s25) if the applied criterion is not satisfied, on the other hand, allow the delta-carrier-phase-observables-computation procedure$_{a,b+u}$ to be performed (step s30) with higher accuracy and/or effectivity (i.e., solution availability). Maintaining continuity of carrier phase measurements provides for the ability to carry on forming valid delta carrier phase observables, whereas ensuring stability of the NSS satellite measurement geometry minimizes error accumulation in the delta-position estimates, or, more generally, in the applicable delta-parameters estimates. In other words, the method aims at maximizing the accuracy with which delta-position estimates can be determined, by shifting the anchor epoch adaptively.

Figure 4A:
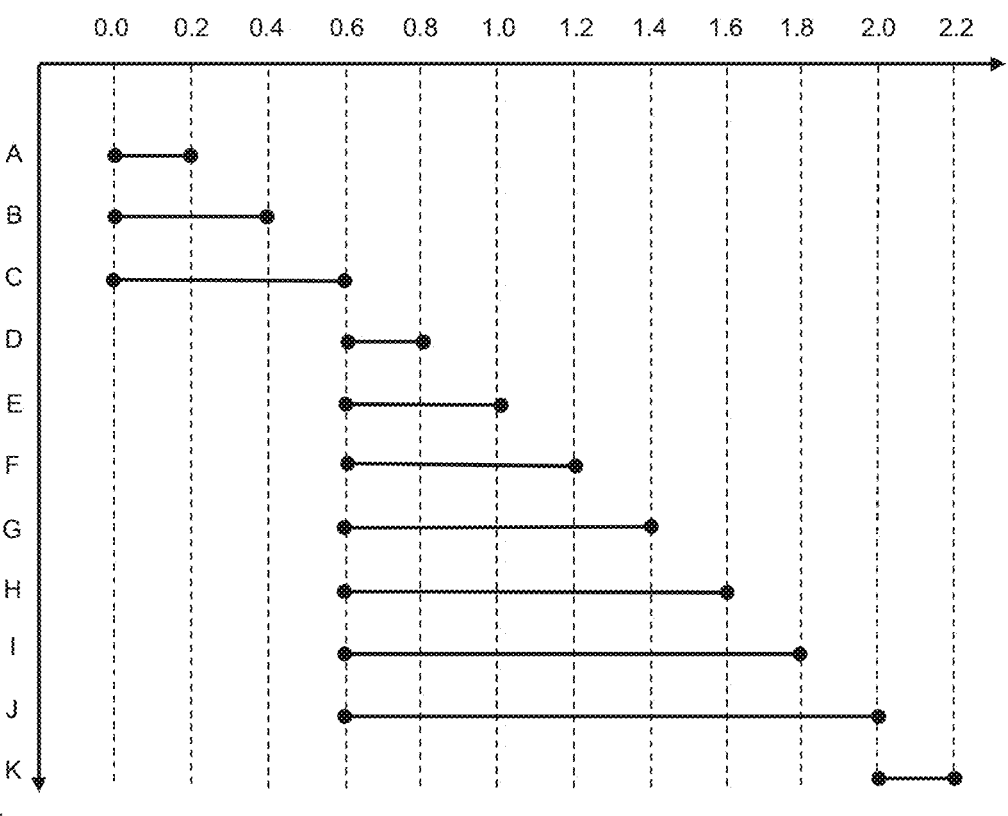
FIGS. 4a and 4b schematically illustrate two examples of realization of methods in two embodiments of the invention, respectively.
Figure 4B:
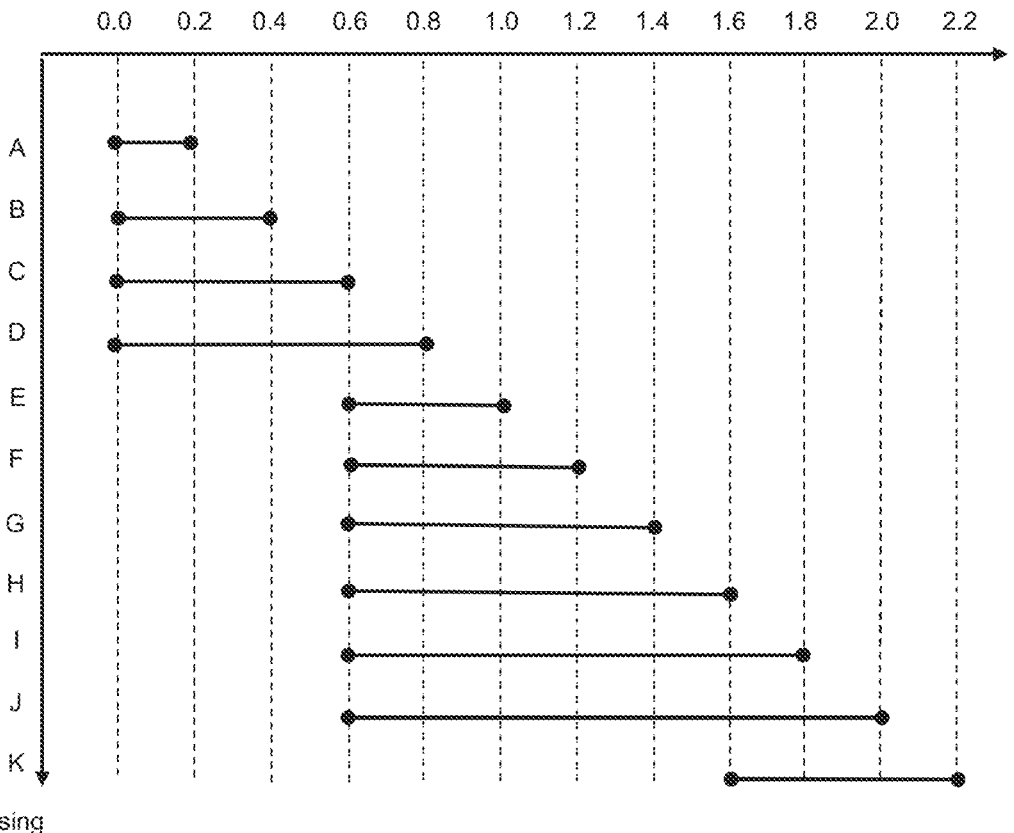

FIGS. 4a and 4b schematically illustrate two examples of realization of methods in two embodiments of the invention, respectively. The horizontal axis in each of FIGS. 4a and 4b represents the measurement update epochs (which may or may not be equal to the receiver epochs), and the vertical axis represents the processing iterations. Here, measurement update interval u is 0.2 s long, and the value of the terminus epoch is incremented by measurement update interval u at each of the processing iterations.

In FIG. 4a, the delta-carrier-phase observables formed in processing iterations A, B, and C are computed with the same value of anchor epoch a (0.0 s). That is, in processing iteration A, step s10 (as described above with reference to FIGS. 3a to 3c) is performed to form delta-carrier-phase observables with anchor epoch 0.0 s and terminus epoch 0.2 s. Then, between processing iterations A and B, step s20 (as described above with reference to FIGS. 3a to 3c) results in the determination that the criterion is satisfied, so that step s25 is skipped, i.e. the anchor epoch is not moved forward. In processing iteration B, step s30 is performed to form delta-carrier-phase observables with anchor epoch 0.0 s and terminus epoch 0.4 s. Then, between processing iterations B and C, step s20 again results in the determination that the criterion is satisfied, so that step s25 is again skipped, i.e. the anchor epoch is not moved forward, and, in processing iteration C, step s30 is performed to form delta-carrier-phase observables with anchor epoch 0.0 s and terminus epoch 0.6 s. Thereafter, between processing iterations C and D, step s20 results in the determination that the criterion is not satisfied, so that step s25 is performed, i.e. the anchor epoch is moved forward. More precisely, the value of the anchor epoch is increased to 0.6 s, which is the value of the terminus epoch of the previous processing iteration, i.e. processing iteration C, and delta-carrier-phase observables are formed with anchor epoch 0.6 s and terminus epoch 0.8 s (step s30). In subsequent processing iterations E to J, because it is determined in step 20 that the criterion is satisfied prior to each of these iterations, the delta-carrier-phase observables are computed with the same (new) value of anchor epoch a (0.6 s) set earlier for processing iteration D. Then, for processing iteration K, the value of the anchor epoch is again increased (because it is determined in step 20 that the criterion is not satisfied), this time to 2.0 s, i.e. the value of the terminus epoch of the previous processing iteration, i.e. processing iteration J, and delta-carrier-phase observables are formed with anchor epoch 2.0 s and terminus epoch 2.2 s (step s30). And so on, depending on the outcome of step s20.

FIG. 4b illustrates that, when the anchor epoch is moved forward, it is not necessarily moved forward to the epoch immediately preceding the new terminus epoch. It may be moved forward to another epoch preceding the new terminus epoch. Namely, the delta-carrier-phase observables formed in processing iterations A, B, C and D are computed with the same value of the anchor epoch a (0.0 s). Then, for processing iteration E, in accordance with step s25, the value of the anchor epoch is increased to 0.6 s, which is not the value of the terminus epoch of the previous processing iteration, i.e. processing iteration D, but the terminus epoch of previous to last processing iteration, i.e. processing iteration C, and delta-carrier-phase observables are then formed with anchor epoch 0.6 s and terminus epoch 1.0 s (step s30). In subsequent processing iterations F to J, the delta-carrier-phase observables are computed with the same (new) value of the anchor epoch a (0.6 s) set earlier for processing iteration E. Then, for processing iteration K, in accordance with step s25, the value of the anchor epoch is again increased, this time to 1.6 s, which is not the value of the terminus epoch of the previous processing iteration, i.e. processing iteration J, but the terminus epoch of processing iteration H, and delta-carrier-phase observables are formed with anchor epoch 1.6 s and terminus epoch 2.2 s (step s30).

Compared to the stepwise processing reference implementation and the preset anchor epoch reference implementation discussed with reference to FIGS. 1 and 2, the method of the embodiments illustrated in FIGS. 4a and 4b is generally capable of adapting the anchor epoch update interval depending on current NSS-related tracking conditions. This improves the accuracy and effectivity (i.e., solution availability) of the delta-carrier-phase observables-computation-procedure$_{m,n}$. As such, the method is capable of moving the anchor epoch forward if the current tracking conditions are degraded, i.e. in accordance with a criterion indicative of continuity of carrier phase measurements from epoch a to epoch b+u and/or stability of NSS satellite measurement geometry from epoch a to epoch b+u. If the criterion is satisfied, the anchor epoch is not changed and the delta-phase interval is maximized, resulting in improved noise and error detection and improved accuracy of the delta-carrier-phase observables-computation-procedure$_{m,n}$.

In one embodiment, the method is performed at least partially as part of a data post-processing process. In other words, the invention is not limited to a real-time operation. Rather, it may be applied for processing pre-collected data to determine a position, trajectory, or other information, in post-processing. For example, the observations may be retrieved from a set of data which was previously collected and stored, the processing may be conducted for example in an office computer long after the data collection and thus not in real-time.

In one embodiment (which may be referred to as "reverse-time, post-processing embodiment"), the method is performed at least partially in a post-processing manner (as explained in the preceding paragraph), the term "subsequent" in the definition of delta-carrier-phase-observables-computation procedure$_{m,n}$ means "following in order", and the epochs are ordered in reverse time. This reverse-time order means that the epoch's values are also increasing in reverse time, in accordance with the above-referred reverse time order, i.e. in a negative sense with respect to time. This embodiment reflects the possibility of running the method in reverse time. That is, for post-processing applications, the data, i.e. the carrier phase observables, can effectively be run backwards, and all of what is described in the present document can still be applied.

In one embodiment, the method is performed in both forward and reverse time post-processing. This is advantageous in that, in a forward processing run, it takes time to resolve integer carrier phase ambiguities immediately following some tracking interruption, such as that caused by an overpass. These data segments can often be populated with integer resolved solutions when processing in reverse time.

Figure 5:
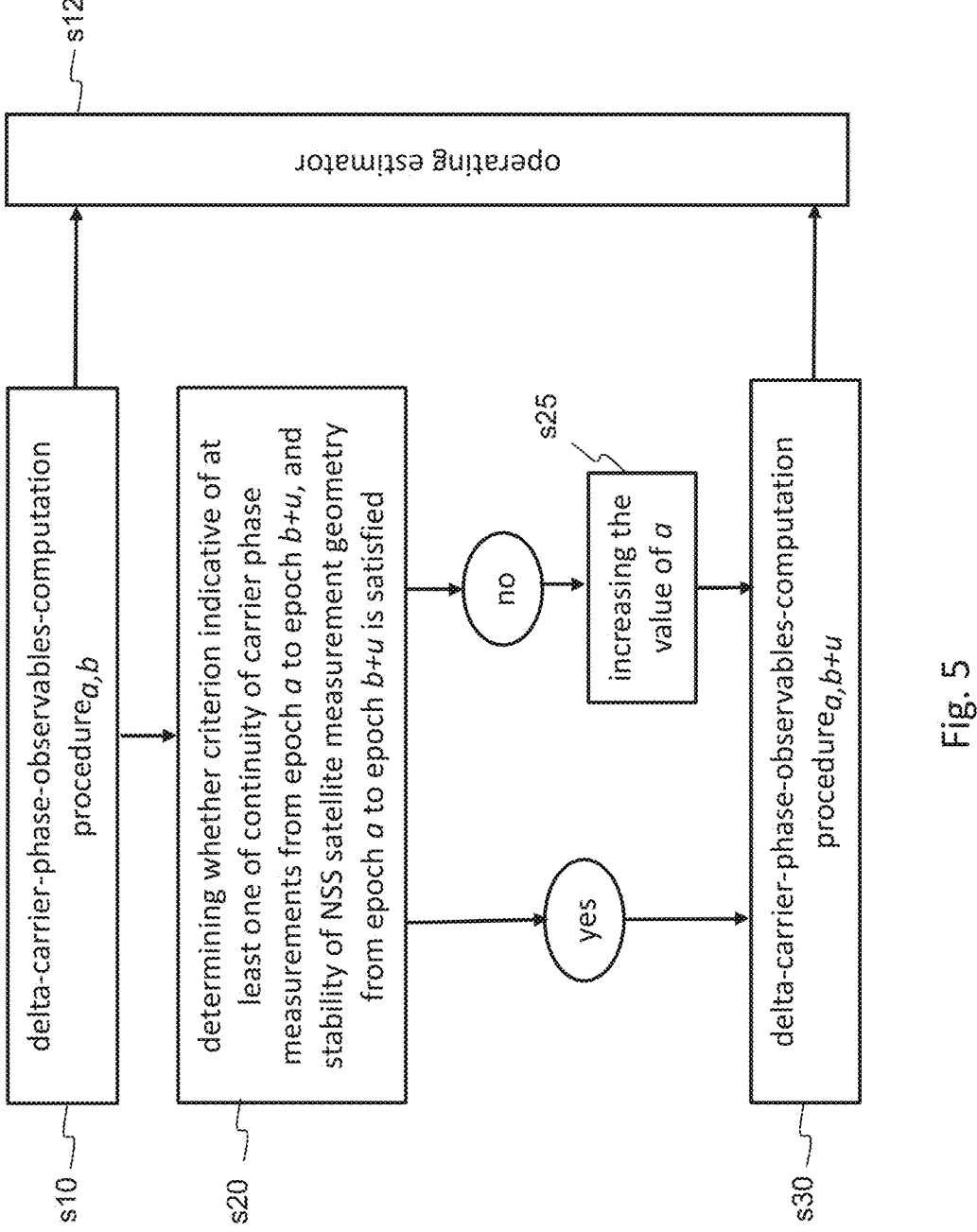
FIG. 5 is a flowchart of a method in one embodiment of the invention, comprising operating an estimation process referred to in the present document as "estimator"

In one embodiment, as illustrated by the flowchart of FIG. 5, an estimation process, hereinafter referred to as "estimator", is operated s12 as part of the method in addition to steps s10, s20, s25, and s30. The estimator uses state variables and computes the values of its state variables at least based on the computed time-differenced carrier phase observables (i.e., computed in step s10 and then in step s30). In one embodiment, the estimator computes a trajectory solution using NSS signals observed by the NSS receiver and more specifically using computed time-differenced carrier phase observables. By "trajectory", it is here meant a change in position over time with respect to a reference position. An estimator computing a trajectory solution using delta carrier phase observables is advantageous in terms of implementation notably because it may involve a relatively small number of states, i.e. a relatively small number of state variables, and because position increments are computed based on carrier phase observables (which are known to yield a more precise positioning solution than code observables) without having to resolve the integer ambiguities in the carrier phases.

The estimator is or comprises an algorithm, procedure, or process, or a piece of software, firmware, and/or hardware configured for implementing such an algorithm, procedure, or process, in which a set of state variables (or "state vector") is maintained over time, i.e. the values of the state variables are estimated based on measurements made over time. The measurements may comprise data representing the observed NSS signals. The estimator involves, in one embodiment, a Kalman filter, a least mean squares (LMS) estimator, and/or a robust estimator. In one embodiment, the estimator involves an LMS estimator with memory. In another embodiment, the estimator involves an LMS estimator without memory, i.e. an LMS estimator in which LMS estimates are computed independently per epoch. The invention is, however, not limited to the use of Kalman filter(s) and/or LMS estimator(s). Other estimation processes, filters, or filter techniques may be used.

The estimator's state variables may represent, for example, the position of the NSS receiver, an offset in the position of the NSS receiver relative to another position (the offset per se being therefore a relative position), an offset in the position of the NSS receiver relative to another epoch, the rate of change of the position, the rate of change of the offset in the position, a bias related to the NSS receiver, a bias related to any of the NSS satellites, a bias related to any of the satellite systems, a bias related to any of the NSS signals, the rate of change of any of the said biases, or any combination of the above.

Figure 6A:
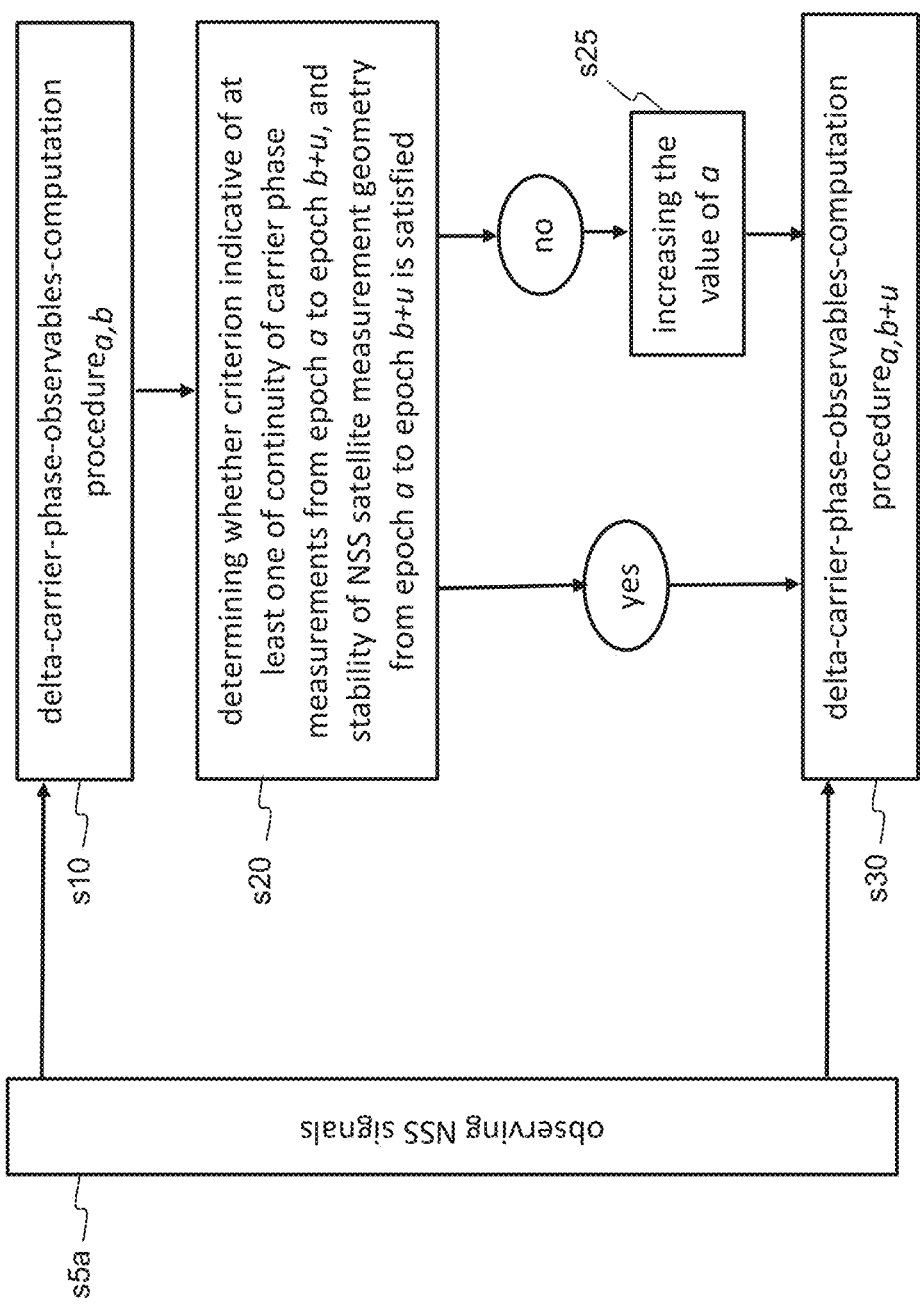
FIGS. 6a and 6b are flowcharts of methods in two embodiments of the invention, comprising respectively observing NSS signals (FIG. 6a) and receiving input data from an external NSS receiver (FIG. 6b)

FIG. 6a is a flowchart of a method in one embodiment of the invention, further comprising, compared to FIG. 3a, a step s5a of observing NSS signals. That is, in this embodiment, steps s10, s20, s25, and s30 are carried out at least by an NSS receiver, and the NSS receiver also carries out step s5a of observing NSS signals.

Figure 6B:
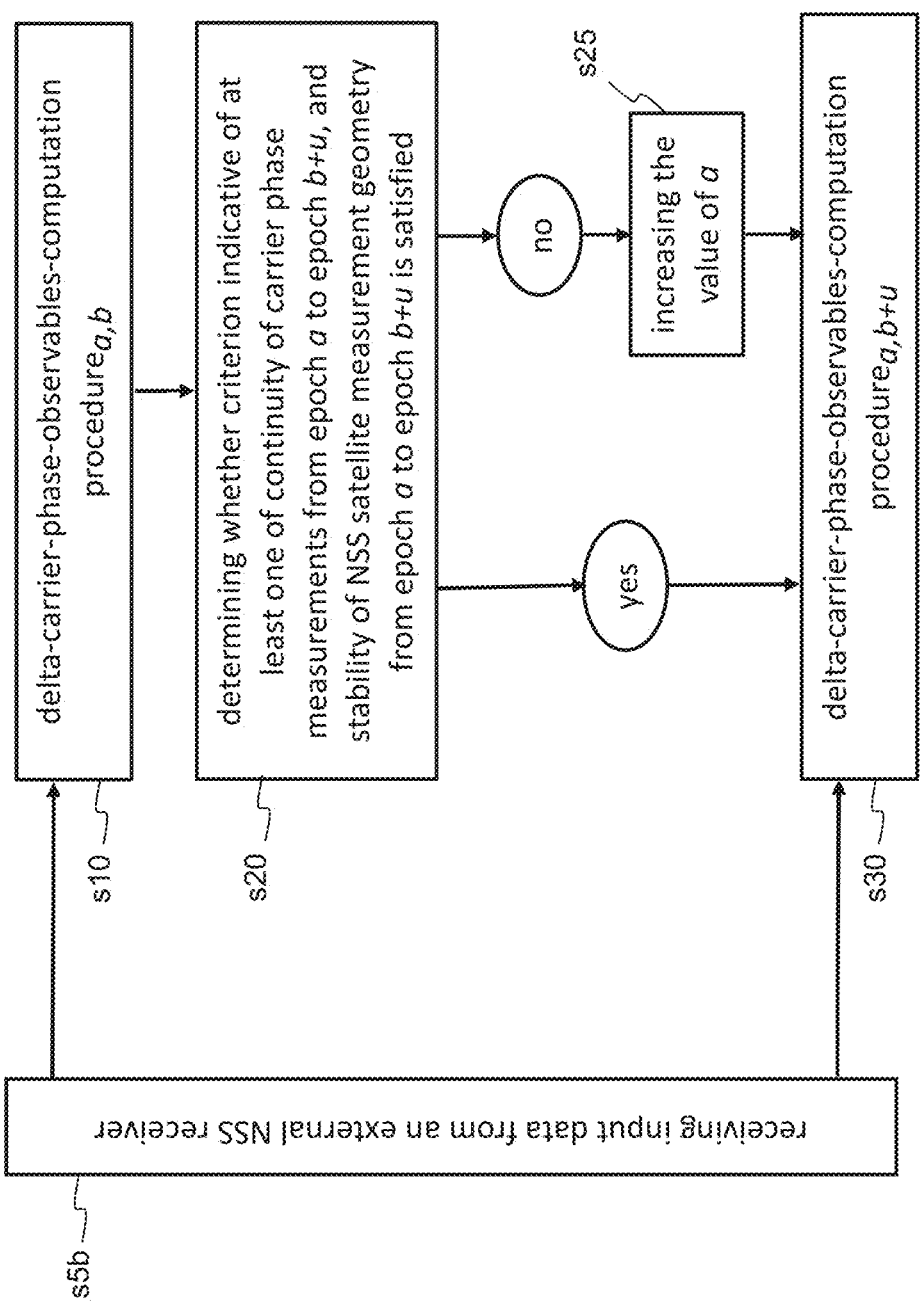

FIG. 6b is a flowchart of a method in another embodiment of the invention, wherein an NSS receiver observes NSS signals (not illustrated in FIG. 6b). Then, in contrast to FIG. 6a, the NSS receiver transmits data representing the observed NSS signals, or information derived therefrom, to another processing entity or set of processing entities in charge of carrying out steps s10, s20, s25, and s30, which then receives s5b the data representing the observed NSS signals, or information derived therefrom.

Still with reference to FIG. 6b, the data representing the observed NSS signals, or information derived therefrom, may for example be transmitted from the NSS receiver in the form of data packets, such as IP packets, through, for example, any one of, or a combination of, the Internet, a cellular network, and a suitable satellite link. The skilled person would, however, appreciate that other forms of wired or wireless transmission may be used, such as, and without being limited to, wireless transmissions based on Bluetooth, Wi-Fi, or Li-Fi. In one embodiment, the data representing the observed NSS signals is transmitted in real-time, i.e. as soon as available (in line with the above-mentioned definition of the term "real-time"). In one embodiment, the data representing the observed NSS signals is transmitted as a data stream in that messages containing said data are transmitted at regular or irregular intervals through the same communication medium or channel. The data representing the observed NSS signals may be encoded and/or encrypted prior to transmission.

Figure 7A:
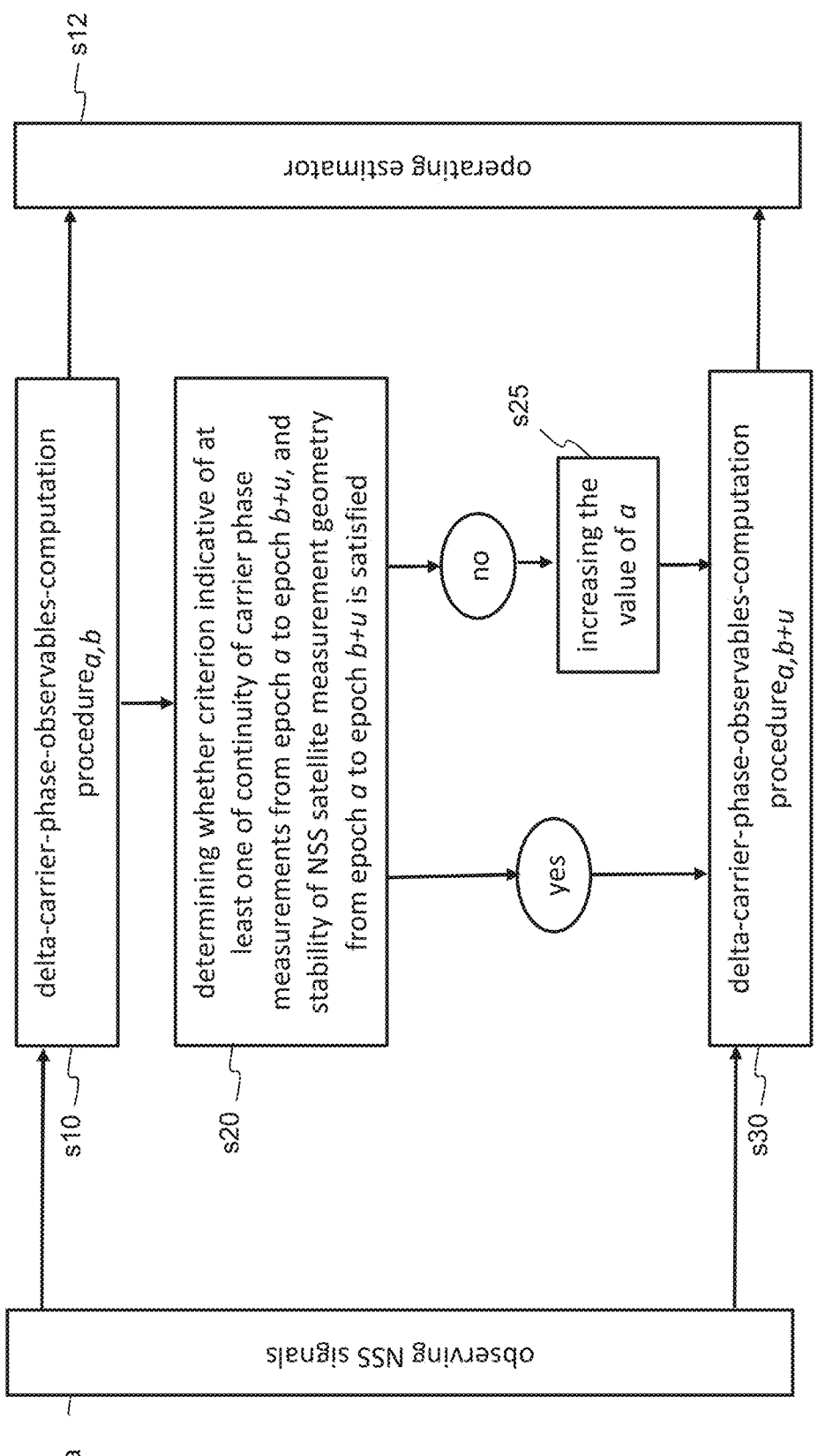
FIGS. 7a and 7b are flowcharts of methods in two embodiments of the invention, each comprising operating an estimator (as in FIG. 5) and also comprising respectively observing NSS signals (FIG. 7a) and receiving input data from an external NSS receiver (FIG. 7b)

FIG. 7a is a flowchart of a method in one embodiment of the invention, further comprising, compared to FIG. 6a, a step s12 of operating an estimator, as already described above with reference to FIG. 5. That is, in this embodiment, steps s10, s12, s20, s25, and s30 are carried out by an NSS receiver, and the NSS receiver also carries out step s5a of observing NSS signals. In other words, the estimator is operated locally on the NSS receiver.

Figure 7B:
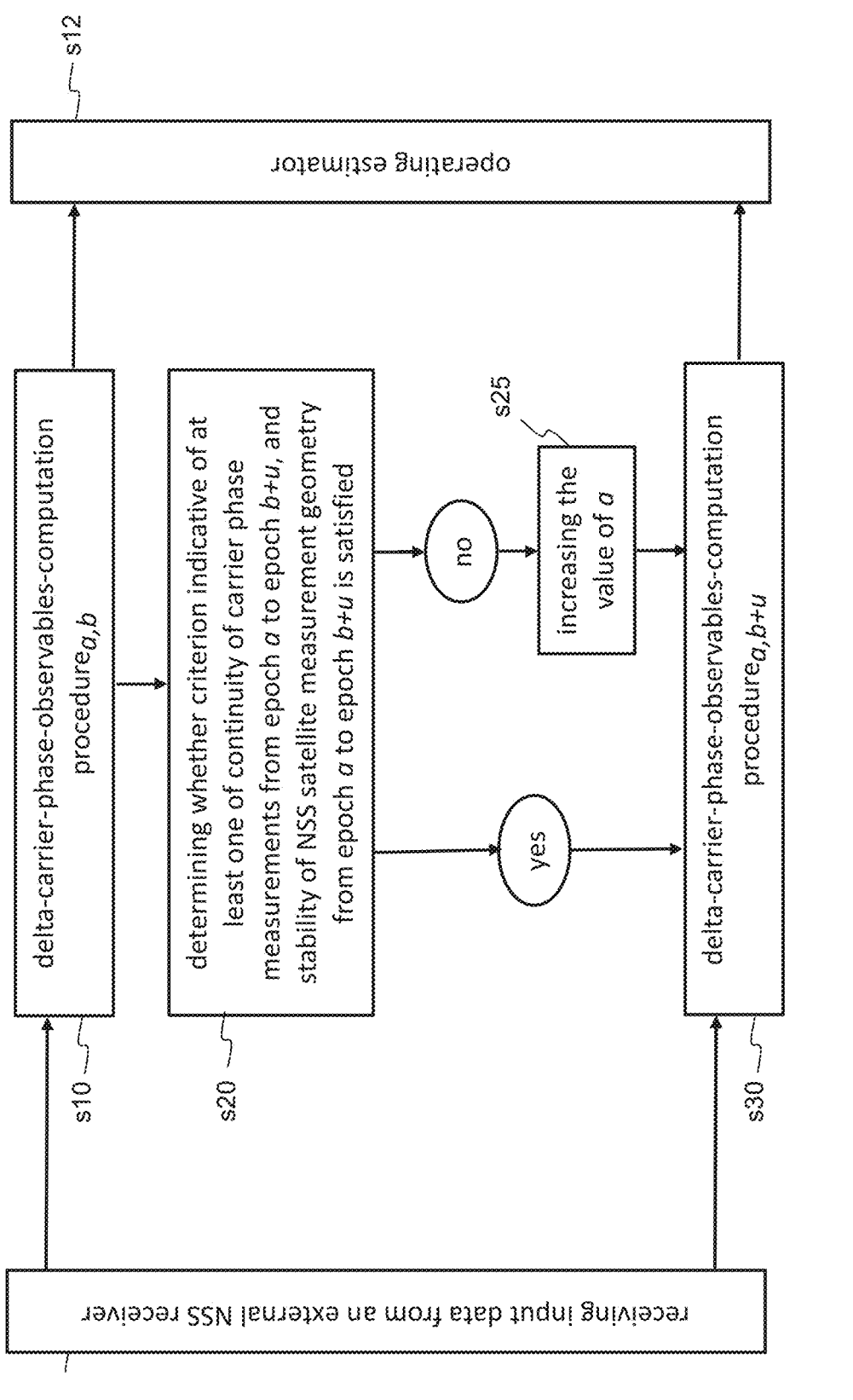

FIG. 7b is a flowchart of a method in one embodiment of the invention, which also further comprises, compared to FIG. 6b, a step s12 of operating an estimator as described above with reference to FIG. 5. Namely, in this embodiment, steps s10, s12, s20, s25, and s30 are carried out by another processing entity or set of processing entities than the NSS receiver. For example, the estimator may be operated on an external computer, processing unit, or the like. In other words, the estimator is not operated locally by the NSS receiver but remotely therefrom.

In the embodiments illustrated in FIGS. 7a and 7b, the computed delta-phase-carrier-observables are used to estimate state variables such as, for example, the position of a NSS receiver. The state variables may be estimated either directly on the NSS receiver itself (FIG. 7a) or on another processing entity or set of processing entities (FIG. 7b).

Figure 8:
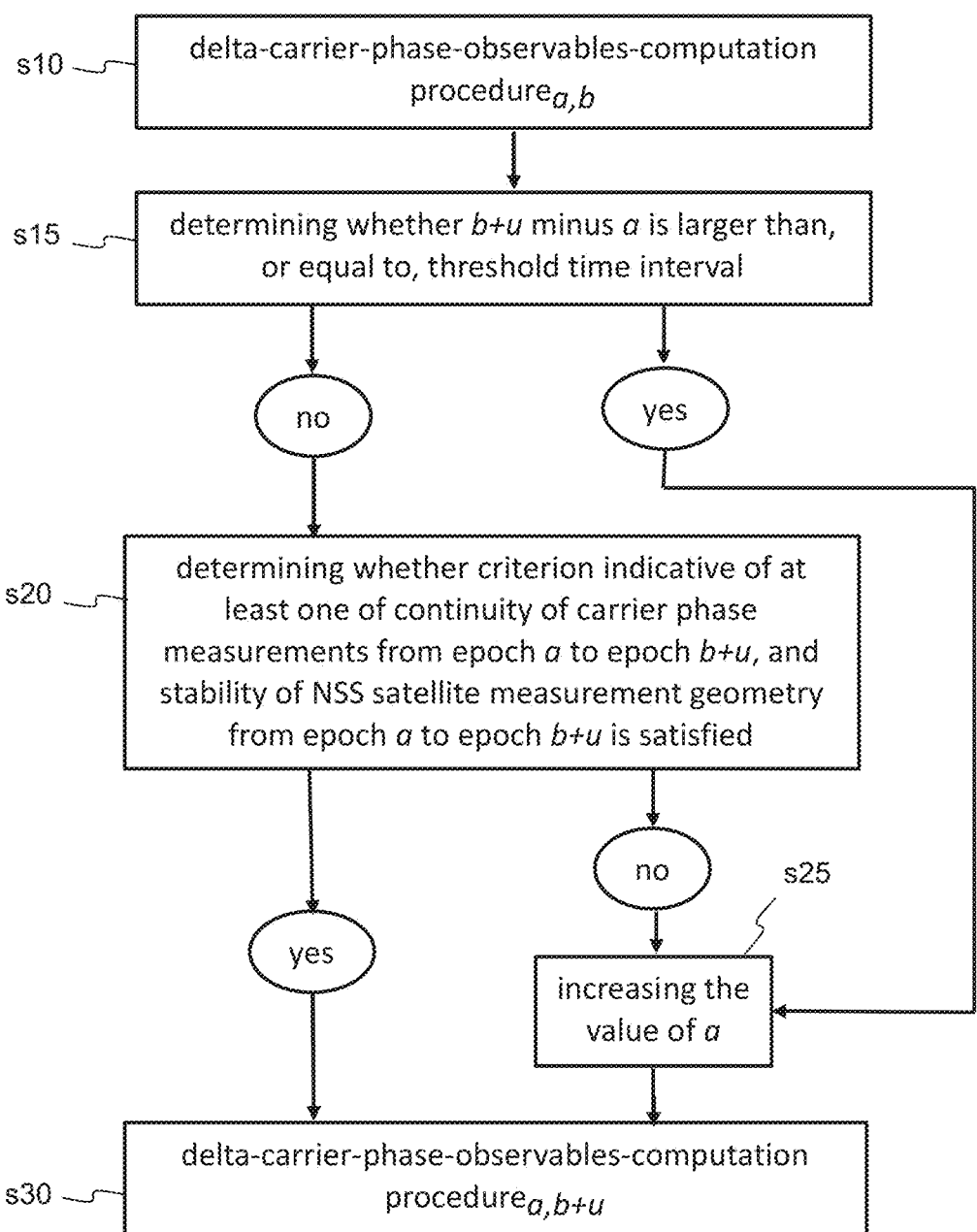
FIG. 8 is a flowchart of a method in one embodiment of the invention, comprising checking whether a threshold time interval has been reached (or exceeded)
Figure 9A:
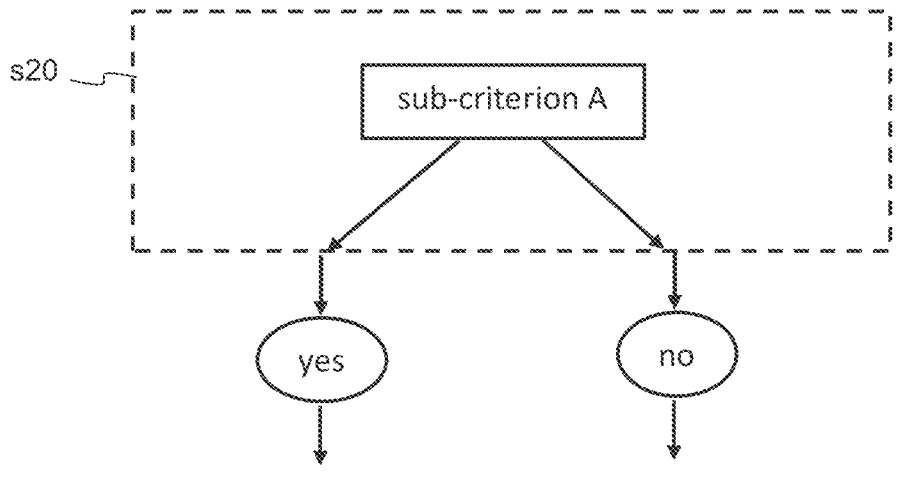
FIGS. 9a to 9g are flowcharts of part of methods in seven embodiments of the invention, involving different criteria indicative of continuity of carrier phase measurements from epoch a to epoch b+u, the criteria each comprising a specific sub-criterion or a specific combination of sub-criteria.
Figure 9B:
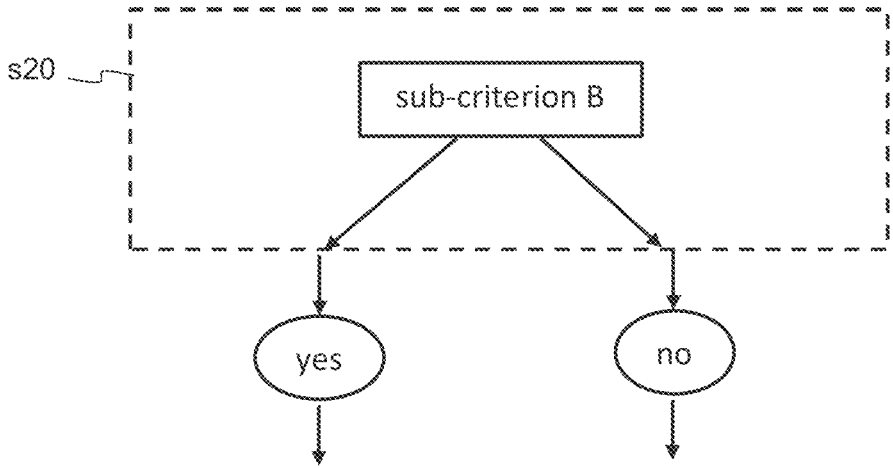
Figures 9C, 9D:
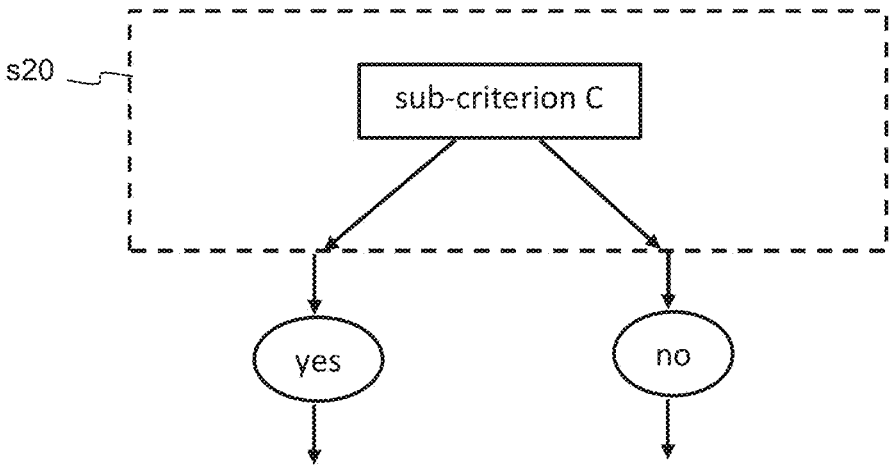
Figures 9E, 9F:
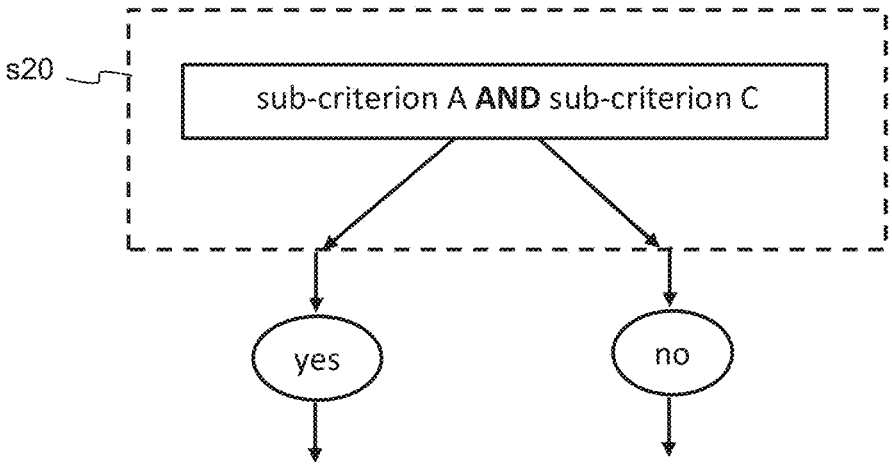
Figure 9G:
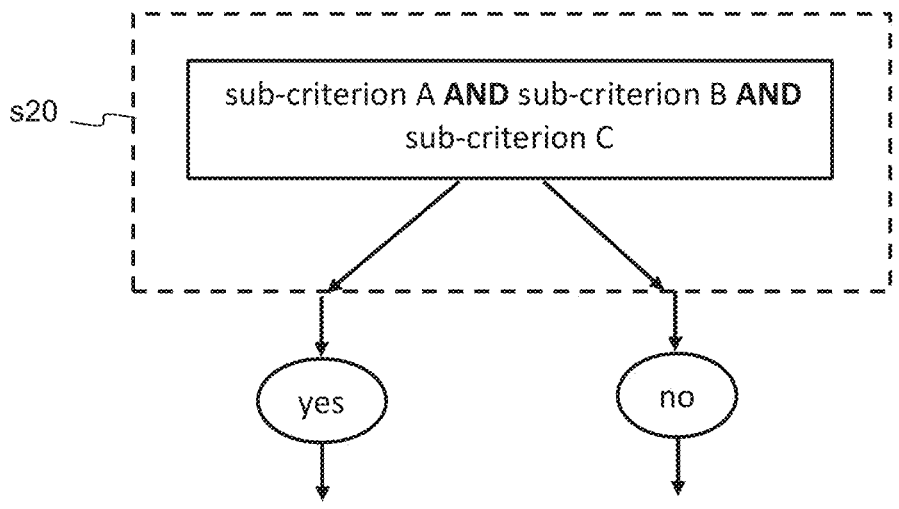

FIG. 8 is a flowchart of a method in one embodiment of the invention, further comprising a step s15 of determining whether b+u minus a is larger than, or equal to, a threshold time interval, and, if so, increasing the value of a regardless of whether the criterion is satisfied. The threshold time interval has a value that is larger than twice measurement update interval u. Step s15 is carried out after performing, in step s10, delta-carrier-phase-observables computation procedure$_{a,b}$ and before performing, in step s30, delta-carrier-phase-observables computation procedure$_{a,b+u}$. Here, "increasing the value of a regardless of whether the criterion is satisfied" means that, if it is determined that b+u minus a is larger than, or equal to, the threshold time interval, the method need not proceed to step s20 but proceeds instead directly to step s25.

In one embodiment, the value of the threshold time interval is preset, i.e. set in advance of performing step s15. In such an embodiment, the threshold time interval may also be called "nominal time interval".

The threshold time interval has, in one embodiment, a value that is smaller than, or equal to, 200 times measurement update interval u, or, in one embodiment, a value that is larger than, or equal to, 3 times measurement update interval u and smaller than, or equal to, 100 times measurement update interval u, or, in a further embodiment, a value that is larger than, or equal to, 4 times measurement update interval u and smaller than, or equal to, 50 times measurement update interval u. A relatively long threshold time interval may result in a relatively long delta-phase interval. Thus, the error accumulation may be limited which may in turn improve the accuracy of the computed delta-carrier-phase observables, because some non-linear errors tend to affect the delta-position estimates if the anchor time interval is very long. On the other hand, a relatively short threshold time interval may lead to a relatively short delta-phase interval. Thus, the likelihood of being able to produce delta-position solutions at each epoch may be maximized. A value of the threshold time interval that is larger than, or equal to, 4 times measurement update interval u and smaller than, or equal to, 50 times measurement update interval u may, in some embodiments, represent a good trade-off between these two aspects.

FIGS. 9a to 9g are flowcharts of part of methods in seven embodiments of the invention, wherein the above-discussed criterion is at least indicative of continuity of carrier phase measurements from epoch a to epoch b+u, and step s20 of determining whether the criterion is satisfied comprises at least one of a sub-criterion A, a sub-criterion B, and a sub-criterion C. Although FIGS. 9a to 9g do not explicitly show above-described steps s10, s25, and s30, these steps are also part of the illustrated methods.

Sub-criterion A comprises determining whether the number of time-differenced carrier phase observables computed when delta-carrier-phase-observables-computation procedure$_{a,b}$ was performed is larger than, or equal to, a threshold, hereinafter referred to as "minimum-number-of-delta-carrier-phase-observables threshold". In other words, sub-criterion A may involve determining whether a valid delta-position solution was computed for epoch b. Sub-criterion A reflects a desire to maintain a minimum number of delta-phase observations to sustain a continuity of delta-position estimates. In one embodiment, the minimum-number-of-delta-carrier-phase-observables threshold is equal to 4. Namely, a minimum of 4 valid delta-carrier-phase observations (from a series of contiguous delta-phase observations, i.e. no cycle-slips in the respective satellite and band phase observation) is generally desirable, and in some cases even required, to solve for the x, y, z position and eliminate time offset (clock-delta).

In another embodiment, the minimum-number-of-delta-carrier-phase-observables threshold is larger than to 4. This reflects the fact that there may be situations where the satellite geometry may be so poor that 4, or even more, satellite measurements may be insufficient.

Sub-criterion B comprises determining whether the number of available carrier phase observables at epoch b+u is larger than, or equal to, a threshold, hereinafter referred to as "minimum-number-of-carrier-phase-observables threshold". In one embodiment, the minimum-number-of-carrier-phase-observables threshold is a minimum number of available carrier phase observables required to form a positioning solution using an estimator as described above, i.e. an estimator using state variables and computing the values of its state variables at least based on the time-differenced carrier phase observables computed in delta-carrier-phase-observables-computation procedure$_{m,n}$.

Sub-criterion C comprises determining whether the number of time-differenced carrier phase observables that is still computable in delta-carrier-phase-observables-computation procedure$_{a,b+u}$ with the current value of a is larger than, or equal to, a threshold, hereinafter referred to as "minimum-number-of-still-computable-delta-carrier-phase-observables threshold". In one embodiment, the minimum-number-of-still-computable-delta-carrier-phase-observables threshold is equal to, or larger than, 4.

FIGS. 9a to 9g schematically illustrate seven combinations of sub-criteria A, B, and C according to seven embodiments of the invention. In the embodiment illustrated in FIG. 9a, the criterion comprises determining whether sub-criterion A is satisfied. In the embodiment illustrated in FIG. 9b, the criterion comprises determining whether sub-criterion B is satisfied. In the embodiment illustrated in FIG. 9c, the criterion comprises determining whether sub-criterion C is satisfied. In the embodiment illustrated in FIG. 9d, the criterion comprises determining whether the sub-criteria A and B are both satisfied. In the embodiment illustrated in FIG. 9e, the criterion comprises determining whether sub-criteria A and C are both satisfied. In the embodiment illustrated in FIG. 9f, the criterion comprises determining whether sub-criteria B and C are both satisfied. In the embodiment illustrated in FIG. 9g, the criterion comprises determining whether sub-criteria A, B, and C are all satisfied.

Sub-criteria A and B generally reflect whether or not carrier phase continuity and delta positioning can be formed from the last epoch to the current epoch. On the other hand, sub-criterion C reflects how the anchor epoch can be adjusted in order to control performance of delta-phase processing.

Figure 10:
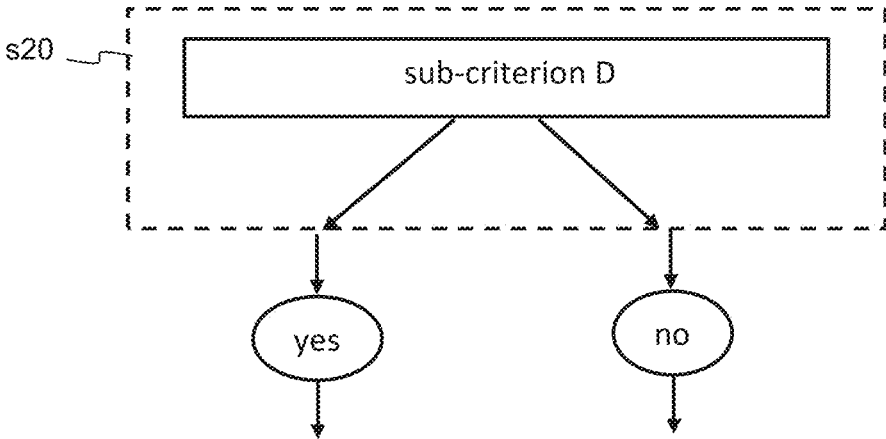
FIG. 10 is a flowchart of part of a method in one embodiment of the invention, involving a criterion indicative of stability of NSS satellite measurement geometry from epoch a to epoch b+u, the criterion comprising a specific sub-criterion.

FIG. 10 is a flowchart of part of a method in one embodiment of the invention, wherein the above-discussed criterion is at least indicative of stability of NSS satellite measurement geometry from epoch a to epoch b+u, and step s20 of determining whether the criterion is satisfied comprises a sub-criterion D. Although FIG. 10 does not explicitly show above-described steps s10, s25, and s30, these steps are also part of the illustrated method.

Sub-criterion D comprises determining whether a measure of quality of the NSS satellite measurement geometry at epoch a, said measure of quality being hereinafter referred to as "measure$_a$", is not significantly worse than a measure of quality of the NSS satellite measurement geometry at epoch b+u, said measure of quality being hereinafter referred to as "measure$_{b+u}$". Sub-criterion D reflects, like sub-criterion C, how the anchor epoch can be adjusted in order to control performance of delta-phase processing.

In one embodiment, measure$_a$ is the number of time-differenced carrier phase observables computed when delta-carrier-phase-observables-computation procedure$_{a,b}$ was performed, in step s10, and measure$_{b+u}$ is the number of available carrier phase observables at epoch b+u. This reflects the fact that the number of delta-phase observations that can be formed between a and b+u is generally governed by the intersection of the number of continuous carrier phase measurements across this interval. If the number of carrier phase measurements at epoch b+u is significantly greater than the number of delta-phase measurements that can be formed between a and b+u, then it is generally desirable to shift the anchor.

In one embodiment, measure$_a$ is an inverse geometric dilution of precision (GDOP) based on the time-differenced carrier phase observables computed when delta-carrier-phase-observables-computation procedure$_{a,b}$ was performed, in step s10, and measure$_b$+, is an inverse GDOP based on the available carrier phase observables at epoch b+u.

The determination as to whether measure$_a$ is not significantly worse than measure$_{b+u}$ may comprise determining whether measure$_a$ is larger than, or equal to, k times measure$_{b+u}$, whether k is a number larger than 0 and smaller than 1, preferably a number larger than 0.4 and smaller than 0.9, and more preferably a number larger than 0.6 and smaller than 0.8.

Sub-criterion D may be combined, in some embodiments, with any of sub-criteria A, B, and C described with reference to FIGS. 9a to 9g, or any combination thereof, in case the criterion is indicative of both continuity of carrier phase measurements from epoch a to epoch b+u and stability of NSS satellite measurement geometry from epoch a to epoch b+u.

In one embodiment, the method further comprises, after performing, in step s30, delta-carrier-phase-observables-computation procedure$_{a,b+u}$, at least one occurrence of the following operations, with the value of b being incremented by measurement update interval u before each occurrence: determining (step s20) whether the criterion is satisfied, and, if not, increasing the value of a (step s25); and performing (step s30) delta-carrier-phase-observables-computation procedure$_{a,b+u}$. In other words, steps s20 to s30 may be repeated, the value of the terminus epoch being incremented by measurement update interval u at each occurrence. That is, steps s20 to s30 are repeated as illustrated by FIGS. 4a and 4b. In such a manner, delta carrier phase observables may be repeatedly formed over time. The number of iterations may be a preset number. Alternatively, the number of iterations may be determined in runtime. For example, the method may be performed as long as a vehicle is moving in order to determine its position along the trajectory it takes.

Before discussing further embodiments of the invention, let us now further explain, in sections A to C below, the context in which some embodiments of the invention have been developed, for a better understanding thereof, as well as some technical considerations that may be helpful for understanding some embodiments of the invention and problems addressed by these embodiments.

A. GNSS Observation Models

Carrier phase measurements comprise the difference between a NSS receiver-generated carrier signal and the carrier signal received from a satellite, at an epoch t. A suitable carrier phase measurement model is given by:

$$\phi_b^k(t) = \rho^k(t) + \Upsilon^k(t) + T(t) + \qquad \text{(Equation 1)}$$
$$\beta_b(t) - I_b^k(t) + \tau^k(t) + m_b^k(t) + \lambda_b N_b^k(t) + \epsilon_b^k(t)$$

where:
k refers to a satellite;
b refers to a tracking frequency band (e.g. GPS L1C/A, GPS L5, Galileo E5-AltBOC, etc.);
t refers to an epoch, i.e. a point in time;

$$\phi_b^k(t)$$

is a carrier phase measurement collected by a NSS receiver to satellite k, on band b, recorded at epoch t (units: meter);
$\rho^k(t)$ denotes a geometric range term (units: meter) and is given as $\sqrt{[x^k(t)-x(t)]^2+[y^k(t)-y(t)]^2+[z^k(t)-z(t)]^2}$, wherein $[x^k(t), y^k(t), z^k(t)]$ are the satellite coordinates at a corresponding signal transmit time and $[x(t), y(t), z(t)]$ are the NSS receiver coordinates;
$\Upsilon^k(t)$ denotes a satellite clock error (units: meter);
$T(t)$ denotes a receiver clock error (units: meter);
$\beta_b(t)$ denotes a receiver carrier-phase hardware bias term (units: meter);

$$I_b^k(t)$$

denotes a frequency-dependent ionospheric phase advance term (hence the negative sign in Equation 1) (units: meter);
$\tau^k(t)$ denotes a tropospheric bias term (units: meter);

$$m_b^k(t)$$

denotes a carrier phase multipath error (units: meter);

$$N_b^k(t)$$

denotes an integer carrier phase ambiguity term (cycles);
$\lambda_b$ denotes a carrier wavelength for band b (units: meter); and $$\epsilon_b^k(t)$$

denotes a random carrier phase error term (units: meter).

The measurement model is presented for a single receiver. However, it is also applicable to single-differenced data, formed by the combination of rover observations, plus corrections derived from any one of: a physical reference (base) receiver; a network of reference receivers; a virtual reference station; and a regionally augmented, or global precise point positioning (PPP) network.

Carrier phase measurements are typically recorded on all satellite tracking channels simultaneously, at an epoch interval of, for example, 0.1 s, that is, at a 10 Hz rate. Differentially corrected carrier phase measurements are routinely used for high-precision real-time kinematic (RTK) and PPP applications. Differential corrections reduce the magnitude of satellite orbit and satellite clock errors, and atmospheric errors.

Carrier phase measurements have millimeter-level precision but suffer from the various bias errors outlined in Equation 1 above. In particular, the integer carrier phase ambiguity term represents a bias of many meters that should be resolved in order to achieve centimeter-level positioning accuracies.

Ionospheric and tropospheric errors can be on the order of many meters for a single NSS receiver but are reduced by several orders of magnitude when using differential techniques.

B. GNSS Delta-Phase Measurements

Delta-phase measurements, also called "delta-carrier-phase measurements", are formed by differencing in time carrier phase measurements of a NSS receiver, measured to a single satellite, on a single tracking band:

$$\delta\phi_b^k(t_1, t_2) \equiv \phi_b^k(t_2) - \phi_b^k(t_1) \qquad \text{(Eq. 2)}$$

The sign "$\equiv$" means "is equal by definition" or "is defined as".

Let $t_1$ be referred to as the anchor epoch, i.e. the epoch at which a delta-phase measurement is anchored. The delta-phase measurement model is given by:

$$\delta\phi_b^k(t_1, t_2) = \delta\rho^k(t_1, t_2) + \delta\Upsilon^k(t_1, t_2) + \delta T(t_1, t_2) - \qquad \text{(Eq. 3)}$$
$$\delta I_b^k(t_1, t_2) + \delta\tau^k(t_1, t_2) + \delta m_b^k(t_1, t_2) + \delta\epsilon_b^k(t_1, t_2)$$

where:

$$\delta\phi_b^k(t_1, t_2)$$

denotes a delta-phase measurement between epochs $t_1$ and $t_2$ to satellite k on band b;

$\delta\rho^k(t_1, t_2)$ denotes a delta geometric range term $\rho^k(t_2) - \rho^k(t_1)$ containing the change in position of the rover receiver between epochs $t_1$ and $t_2$;

$\delta\gamma^k(t_1, t_2)$ denotes a change in satellite clock error;

$\delta T(t_1, t_2)$ denotes a change in receiver clock error;

$$\delta I_b^k(t_1, t_2)$$

denotes a change in ionospheric phase advance;

$\delta\tau_b^k(t_1, t_2)$ denotes a change in tropospheric error;

$$\delta m_b^k(t_1, t_2)$$

denotes a change in carrier phase multipath; and $$\delta\epsilon_b^k(t_1, t_2)$$

denotes a delta-phase random error term.

The carrier phase ambiguity term is absent from Equation 3, since it is a constant for continuously tracked measurements and therefore differences away. Similarly, the receiver hardware bias term $\beta_b(t)$ can be assumed to be constant, or virtually so over short time intervals and therefore it differences away in Equation 3. NSS satellite atomic clocks are very stable—clock correction models are provided via broadcast ephemerides, or PPP services. Therefore, the satellite clock drift terms $\gamma^k(t)$ can be assumed to be known and/or pre-corrected.

The ionospheric phase advance term $$\delta I_b^k(t_1, t_2)$$

is frequency-dependent and can be removed via the use of multi-band ionospheric-free observations. With single-difference observations collected over short (i.e. smaller than 20 km) reference (base) receiver to rover receiver separation, the ionospheric error changes by just a few millimeters per second and can therefore be treated as a random error source. Under scintillation conditions, the ionospheric error may fluctuate by several cycles per second. Fortunately, ionospheric scintillation is mostly confined to the equatorial anomaly and polar regions of the Earth, during periods of elevated solar activity.

Under stable weather conditions, the tropospheric delay generally changes by just a few millimeters per minute. Moreover, the dry component of the tropospheric delay can be adequately removed via the application of conventional models (see e.g. reference [8], p. 148). The change in tropospheric error $\delta\tau^k(t_1, t_2)$ can therefore be corrected for, or largely ignored.

Carrier phase multipath can change by multiple centimeters per second, particularly under dynamic tracking conditions such as that experienced by vehicles traveling at speed on a highway. When the rover (i.e., the NSS receiver) is static, multipath generally changes slowly, for example, at a rate of 2 mm per second. Rather than estimate the carrier phase multipath error, it can be treated as a random error and be absorbed into $$\delta\epsilon_b^k(t_1, t_2),$$

via an inflation of the variance assigned to delta-phase measurements.

Under the assumptions outlined above, it is possible, without substantial loss of accuracy, to reduce the delta-phase measurement model of Equation 3 to the following simplified form:

$$\delta\phi_b^k(t_1, t_2) = \delta\rho^k(t_1, t_2) + \delta T(t_1, t_2) + \delta\epsilon_b^k(t_1, t_2) \qquad \text{(Eq. 4)}$$

where $\delta\rho^k(t_1, t_2)$ denotes a geometric range term given as $$\sqrt{\begin{array}{c}[\delta x^k(t_1, t_2) - \delta x(t_1, t_2)]^2 + \\ [\delta y^k(t_1, t_2) - \delta y(t_1, t_2)]^2 + [\delta z^k(t_1, t_2) - \delta z(t_1, t_2)]^2\end{array}}$$

where:

$[\delta x^k(t_1, t_2), \delta y^k(t_1, t_2), \delta z^k(t_1, t_2)]$ denotes a change in satellite signal transmit-time coordinates between epochs $t_1$ and $t_2$:

$$\delta x^k(t_1, t_2) = x^k(t_2) - x^k(t_1)$$

$$\delta y^k(t_1, t_2) = y^k(t_2) - y^k(t_1)$$

$$\delta z^k(t_1, t_2) = z^k(t_2) - z^k(t_1)$$

$[\delta x(t_1, t_2), \delta y(t_1, t_2), \delta z(t_1, t_2)]$ denotes a change in receiver coordinates
between epochs $t_1$ and $t_2$:

$$\delta x(t_1, t_2) = x(t_2) - x(t_1)$$

$$\delta y(t_1, t_2) = y(t_2) - y(t_1)$$

$$\delta z(t_1, t_2) = z(t_2) - z(t_1)$$

Least squares estimation or Kalman filtering require linear relationships between the observations and the unknown parameters. Therefore, if a least squares estimation or Kalman filtering is used, it is desirable to linearize Equation 4 using first-order terms of a Taylor's series:

$$\delta\phi_b^k(t_1, t_2) = \delta\underline{\rho}^k(t_1, t_2) + \frac{x^k(t_2) - x(t_2)}{\underline{\rho}^k(t_2)}\Delta x(t_2) + \qquad \text{(Eq. 5)}$$

$$\frac{y^k(t_2) - y(t_2)}{\underline{\rho}^k(t_2)}\Delta y(t_2) + \frac{z^k(t_2) - z(t_2)}{\underline{\rho}^k(t_2)}\Delta z(t_2) - \frac{x^k(t_1) - x(t_1)}{\underline{\rho}^k(t_1)}\Delta x(t_1) +$$

$$\frac{y^k(t_1) - y(t_1)}{\underline{\rho}^k(t_1)}\Delta y(t_1) + \frac{z^k(t_1) - z(t_1)}{\underline{\rho}^k(t_1)}\Delta z(t_1) + \delta T(t_1, t_2) + \delta\epsilon_b^k(t_1, t_2)$$

where:

$(.)$ denotes a quantity computed based on approximate rover coordinates $[\underline{x}(t_1), \underline{y}(t_1), \underline{z}(t_i)]$ at $t_1$, and $[\underline{x}(t_2), \underline{y}(t_2), \underline{z}(t_2)]$ at $t_2$;

$$\frac{x^k(t_2) - x(t_2)}{\underline{\rho}^k(t_2)}; \frac{y^k(t_2) - y(t_2)}{\underline{\rho}^k(t_2)}; \frac{z^k(t_2) - z(t_2)}{\underline{\rho}^k(t_2)}$$

represent the direction cosines for the rover-satellite ranges, expanded in terms of the approximate rover coordinates;

$\Delta x(t_1), \Delta y(t_1), \Delta z(t_1)$ denotes estimated correction terms to the approximate rover coordinates at epoch $t_1$; and $\Delta x(t_2), \Delta y(t_2), \Delta z(t_2)$ denotes estimated correction terms to the approximate rover coordinates at epoch $t_2$.

On the right-hand side of the above Equation 5, the term in the first line denotes an approximate change in user-satellite geometric range, the term in the second line denotes corrections to user position at epoch $t_2$, the term in the third line denotes corrections to user position at epoch $t_1$, the term in the fourth line denotes a change in receiver clock error, and the term in the fifth (last) line denotes a random noise term.

Let $\Lambda^k(t_1)$ be the direction cosine terms for the rover-satellite ranges at epoch $t_1$:

$$\Lambda^k(t_1) = \left[\frac{x^k(t_1) - x(t_1)}{\underline{\rho}^k(t_1)}; \frac{y^k(t_1) - y(t_1)}{\underline{\rho}^k(t_1)}; \frac{z^k(t_1) - z(t_1)}{\underline{\rho}^k(t_1)}\right]$$

and for epoch $t_2$:

$$\Lambda^k(t_2) = \left[\frac{x^k(t_2) - x(t_2)}{\underline{\rho}^k(t_2)}; \frac{y^k(t_2) - y(t_2)}{\underline{\rho}^k(t_2)}; \frac{z^k(t_2) - z(t_2)}{\underline{\rho}^k(t_2)}\right]$$

Using the abbreviated expressions for the direction cosines, and shifting the approximate computed delta-range term onto the left-hand side, leads to a more succinct form of Equation 5:

$$\delta\phi_b^k(t_1, t_2) - \delta\underline{\rho}^k(t_1, t_2) = \Lambda^k(t_2) \circ [\Delta x(t_2), \Delta y(t_2), \Delta z(t_2)]' - \qquad \text{(Eq. 6)}$$

$$\Lambda^k(t_1) \circ [\Delta x(t_1), \Delta y(t_1), \Delta z(t_1)]' + \delta T(t_1, t_2) + \delta\epsilon_b^k(t_1, t_2)$$

Rather than estimating the current and previous rover positions, the change in rover position between epochs $t_1$ and $t_2$ can be directly estimated, in which case the linearized measurement model becomes:

$$\delta\phi_b^k(t_1, t_2) = \qquad\qquad\qquad\qquad\qquad\qquad \text{(Eq. 7)}$$

$$\delta\underline{\rho}^k(t_1, t_2) + \frac{x^k(t_2) - x(t_2)}{\underline{\rho}^k(t_2)}\Delta\delta x(t_1, t_2) + \frac{y^k(t_2) - y(t_2)}{\underline{\rho}^k(t_2)}\Delta\delta y(t_1, t_2) +$$

$$\frac{z^k(t_2) - z(t_2)}{\underline{\rho}^k(t_2)}\Delta\delta z(t_1, t_2) + \delta T(t_1, t_2) + \delta\epsilon_b^k(t_1, t_2),$$

On the right-hand side of the above Equation 7, the term in first line denotes an approximate change in user-satellite geometric range, the terms in the second line denote corrections to delta-position at epoch $t_2$, the term in the third line denotes a change in receiver clock error, and the term in the fourth (last) line denotes random noise term.

Expressing Equation 7 in terms of the direction cosine vector $\Lambda^k(t_2)$, and shifting $\delta\underline{\rho}^k(t_1, t_2)$ to the left-hand side, leads to:

$$\delta\phi_b^k(t_1, t_2) - \delta\underline{\rho}^k(t_1, t_2) = \qquad\qquad\qquad \text{(Eq. 8)}$$

$$\Lambda^k(t_2) \circ [\Delta\delta x(t_1, t_2), \Delta\delta y(t_1, t_2), \Delta\delta z(t_1, t_2)]' + \delta T(t_1, t_2) + \delta\epsilon_b^k(t_1, t_2)$$

C. Estimation

Gathering the parameters of interest in Equation 6 leads to the following state vector definition:

$$x = [x(t_2), y(t_2), z(t_2) \mid (x(t_1), y(t_1), z(t_1) \mid \delta T(t_1, t_2)]' \qquad \text{(Eq. 9)}$$

where [ . . . ]' denotes a vector/matrix transposition and:
$x(t_2)$, $y(t_2)$, $z(t_2)$ denotes the current position;
$x(t_1)$, $y(t_1)$, $z(t_i)$ denotes the anchor position; and
$\delta T(t_1, t_2)$ denotes the delta clock.
The state vector for the model of Equation 8 is given by:

$$x = [\Delta\delta x(t_1, t_2), \Delta\delta y(t_1, t_2), \Delta\delta z(t_1, t_2) \mid \delta T(t_1, t_2)]' \quad \text{(Eq. 10)}$$

where:
$\Delta\delta x(t_1, t_2)$, $\Delta\delta y(t_1, t_2)$, $\Delta\delta z(t_1, t_2)$ denotes the delta position; and
$\delta T(t_i, t_2)$ denotes the delta clock.
The linearized measurement models of Equations 6 and 8 can be written in vector/matrix form as:

$$l + v = Ax \quad \text{(Eq. 11)}$$

where:
1 denotes a (m×1) vector of delta-phase observations minus their computed equivalents;
A denotes a (m×n) coefficient matrix containing measurement partial derivatives relating each delta-phase observation to the estimated parameters;
x denotes a (n×1) state vector containing the estimated parameters; and
v denotes a (m×1) vector of measurement residuals, described stochastically via their covariance matrix R (m×m), where R is assumed to be a diagonal matrix.
Writing Equations 6 and 8 in the form of Equation 11, leads respectively to:

$$[\delta\phi_b^k(t_1, t_2) - \underline{\delta\rho}^k(t_1, t_2)] + [-\delta\epsilon_b^k(t_1, t_2)] = [\Lambda^k(t_1), \Lambda^k(t_2), \quad \text{(Eq. 12)}$$
$$+1] \circ [x(t_2), y(t_2), z(t_2) \mid x(t_1), y(t_1), z(t_1) \mid \delta T(t_1, t_2)]'$$

$$[\delta\phi_b^k(t_1, t_2) - \underline{\delta\rho}^k(t_1, t_2)] + [-\delta\epsilon_b^k(t_1, t_2)] = [\Lambda^k(t_2), \quad \text{(Eq. 13)}$$
$$+1] \circ [\Delta\delta x(t_1, t_2), \Delta\delta y(t_1, t_2), \Delta\delta z(t_1, t_2) \mid \delta T(t_1, t_2)]'$$

The method of least squares or robust estimation can be utilized in the estimation of the state vector parameters described above. In the case of method of least squares, the most probable estimate of the state vector is given by:

$$\hat{x} = (A' WA)^{-1} A Wl \quad \text{(Eq. 14)}$$

where the measurement weight matrix W is given by the inverse of the measurement noise covariance matrix:

$$W = R^{-1} \quad \text{(Eq. 15)}$$

As implied by their name, robust estimation techniques are resilient to measurement outliers (see for example reference [6]) and are suitable for NSS applications where measurement outliers are common.

Alternatively, Kalman filtering techniques can be used to derive estimates of the state vector, in which case the temporal behavior of the state parameters can be described by the following linear dynamic model:

$$x(k) = \Phi(k - 1, k)x(k - 1) + w(k) \quad \text{(Eq. 16)}$$

$$P(k) = \Phi(k - 1, k)P(k - 1)\Phi(k - 1, k)' + Q(k) \quad \text{(Eq. 17)}$$

where:
x(k) denotes a (n×1) state vector at epoch k;
((k−1,k) denotes a (n×n) state transition matrix for epoch k−1, to epoch k;
w(k) denotes (n×n) system driving noise, assumed to be zero-mean, uncorrelated in time and is described by the (n×n) system driving noise covariance matrix Q(k); and
P(k) denotes a (n×n) state vector covariance matrix at epoch k.

When Kalman filtering techniques are employed, the state vector is typically expanded to include rover velocity and optionally rover acceleration parameters. The inclusion of an appropriate vehicle dynamic model helps to strengthen the estimation process. A detailed description of Kalman filtering techniques can be found in reference [7], including suitable dynamic models for GPS applications (see Chapter 11), these models being also suitable for GNSS applications, more generally.

Irrespective of the technique used, let the estimated state vector be denoted $\hat{x}$, and its associated covariance matrix $\hat{P}$.

Let us now describe further embodiments of the invention, together with considerations regarding how these embodiments may be implemented, for example, by software, hardware, or a combination of software and hardware.

Table 1 below shows an exemplary comparison between the stepwise processing reference implementation, the preset anchor epoch reference implementation, and a realization of a method in one embodiment of the invention. The first column indicates the current epoch, the measurement update interval being 0.2 s. In the method according to the preset anchor epoch reference implementation (third column), the anchor epoch is updated at a fixed rate, i.e. every second in the present example. The method according to the stepwise processing reference implementation (second column) can be considered a special case of the preset anchor epoch reference implementation, wherein the anchor epoch interval is identical to the measurement update interval. In the method according to an embodiment of the invention (fourth column), the initial value at 0.0 s of the anchor epoch is updated at epochs 3.0 s and 3.8 s. The updating of the anchor epoch is motivated by FIG. 11.

TABLE 1

Exemplary comparison between the stepwise processing
reference implementation, the preset anchor epoch
reference implementation, and a realization of a
method according to an embodiment of the invention

| Epoch (in seconds) | Stepwise delta-phase schedule (in seconds) | Preset (1 Hz) anchor time Interval (in seconds) | Embodiment of the invention (in seconds) |
|---|---|---|---|
| 0.0 | | | |
| 0.2 | 0.0-0.2 (a = 0.0) | 0.0-0.2 (a = 0.0) | 0.0-0.2 (a = 0.0) |
| 0.4 | 0.2-0.4 (a = 0.2) | 0.0-0.4 | 0.0-0.4 |
| 0.6 | 0.4-0.6 (a = 0.4) | 0.0-0.6 | 0.0-0.6 |
| 0.8 | 0.6-0.8 (a = 0.6) | 0.0-0.8 | 0.0-0.8 |
| 1.0 | 0.8-1.0 (a = 0.8) | 0.0-1.0 | 0.0-1.0 |
| 1.2 | 1.0-1.2 (a = 1.0) | 1.0-1.2 (a = 1.0) | 0.0-1.2 |
| 1.4 | 1.2-1.4 (a = 1.2) | 1.0-1.4 | 0.0-1.4 |
| 1.6 | 1.4-1.6 (a = 1.4) | 1.0-1.6 | 0.0-1.6 |
| 1.8 | 1.6-1.8 (a = 1.6) | 1.0-1.8 | 0.0-1.8 |

TABLE 1-continued

Exemplary comparison between the stepwise processing
reference implementation, the preset anchor epoch
reference implementation, and a realization of a
method according to an embodiment of the invention

| Epoch (in seconds) | Stepwise delta-phase schedule (in seconds) | Preset (1 Hz) anchor time Interval (in seconds) | Embodiment of the invention (in seconds) |
|---|---|---|---|
| 2.0 | 1.8-2.0 (a = 1.8) | 1.0-2.0 | 0.0-2.0 |
| 2.2 | 2.0-2.2 (a = 2.0) | 2.0-2.2 (a = 2.0) | 0.0-2.2 |
| 2.4 | 2.2-2.4 (a = 2.2) | 2.0-2.4 | 0.0-2.4 |
| 2.6 | 2.4-2.6 (a = 2.4) | 2.0-2.6 | 0.0-2.6 |
| 2.8 | 2.6-2.8 (a = 2.6) | 2.0-2.8 | 0.0-2.8 |
| 3.0 | 2.8-3.0 (a = 2.8) | 2.0-3.0 | 2.8-3.0 (a = 2.8) |
| 3.2 | 3.0-3.2 (a = 3.0) | 3.0-3.2 (a = 3.0) | 2.8-3.2 |
| 3.4 | 3.2-3.4 (a = 3.2) | 3.0-3.4 | 2.8-3.4 |
| 3.6 | 3.4-3.6 (a = 3.4) | 3.0-3.6 | 2.8-3.6 |
| 3.8 | 3.6-3.8 (a = 3.6) | 3.0-3.8 | 3.6-3.8 (a = 3.6) |
| 4.0 | 3.8-4.0 (a = 3.8) | 3.8-4.0 | 3.6-4.0 |
| 4.2 | 4.0-4.2 (a = 4.0) | 4.0-4.2 (a = 4.0) | 3.6-4.2 |
| 4.4 | 4.2-4.4 (a = 4.2) | 4.0-4.4 | 3.6-4.4 |
| 4.6 | 4.4-4.6 (a = 4.4) | 4.0-4.6 | 3.6-4.6 |
| 4.8 | 4.6-4.8 (a = 4.6) | 4.0-4.8 | 3.6-4.8 |
| 5.0 | 4.8-5.0 (a = 4.8) | 4.0-5.0 | 3.6-5.0 |

Figure 11:
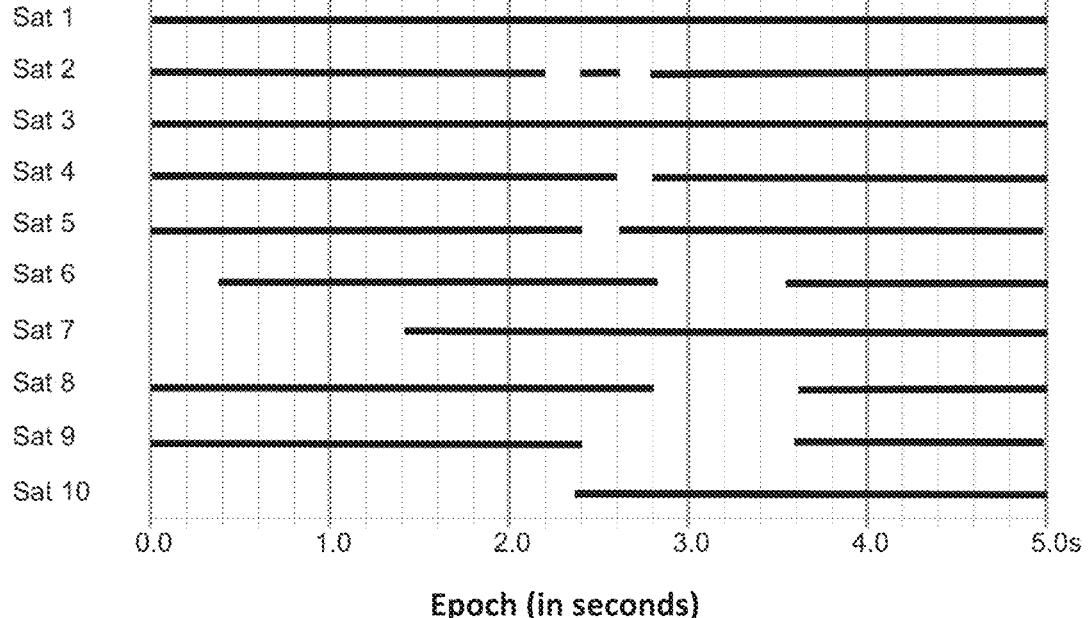
FIG. 11 schematically illustrates carrier-phase tracking for 10 NSS satellites observed on a single-frequency band over a 5-second period, to discuss some embodiments of the invention.

FIG. 11 illustrates carrier-phase tracking for 10 NSS satellites observed on a single-frequency band over a 5 s period corresponding to the information presented in Table 1 (fourth column). Solid, uninterrupted horizontal lines indicate continuous carrier-phase tracking, whereas a gap in the line denotes a cycle slip or loss of tracking. Between 2 and 3 s, tracking is interrupted on 6 NSS satellites (Sat 2, 4, 5, 6, 8, 9), leaving 3 NSS satellites (Sat 1, 3, 7) continuously tracked over the interval 2 to 3 s. Also note that carrier-phase measurements cannot be formed for NSS satellite "Sat 10" during this interval, since this NSS satellite was not tracked at the start of the interval (i.e. at 2.0 s). In the case of the preset anchor epoch reference implementation (third column in Table 1), the satellite measurement geometry may be significantly degraded as a result and the delta-position solution may be unreliable between 2 and 3 s.

As explained above, the stepwise schedule (second column in Table 1), i.e. the stepwise processing reference implementation, maximizes the number of delta carrier phase measurements that can be formed at each epoch. The downside of this approach is that random delta carrier phase measurement errors tend to propagate faster into the estimated delta-positions than using the preset anchor time interval approach (third column in Table 1), i.e. the preset anchor epoch reference implementation. Furthermore, small ramp-like errors on carrier phase measurements from one or more satellites typically tend to be more difficult to identify with the stepwise schedule than with the preset anchor approach. Ramp-like errors can cause the delta-position estimates to drift from the truth. As already explained above, ramp-like errors typically tend to be caused by carrier phase tracking transients, multipath and diffraction errors. The shorter the delta-phase interval, the more difficult it generally becomes to separate random measurement noise and ramp-like errors.

From an error propagation and outlier detection standpoint, it is desirable to maximize the anchor epoch update interval. However, from a measurement and solution availability perspective, it is desirable to minimize the anchor epoch update interval.

Figure 12:
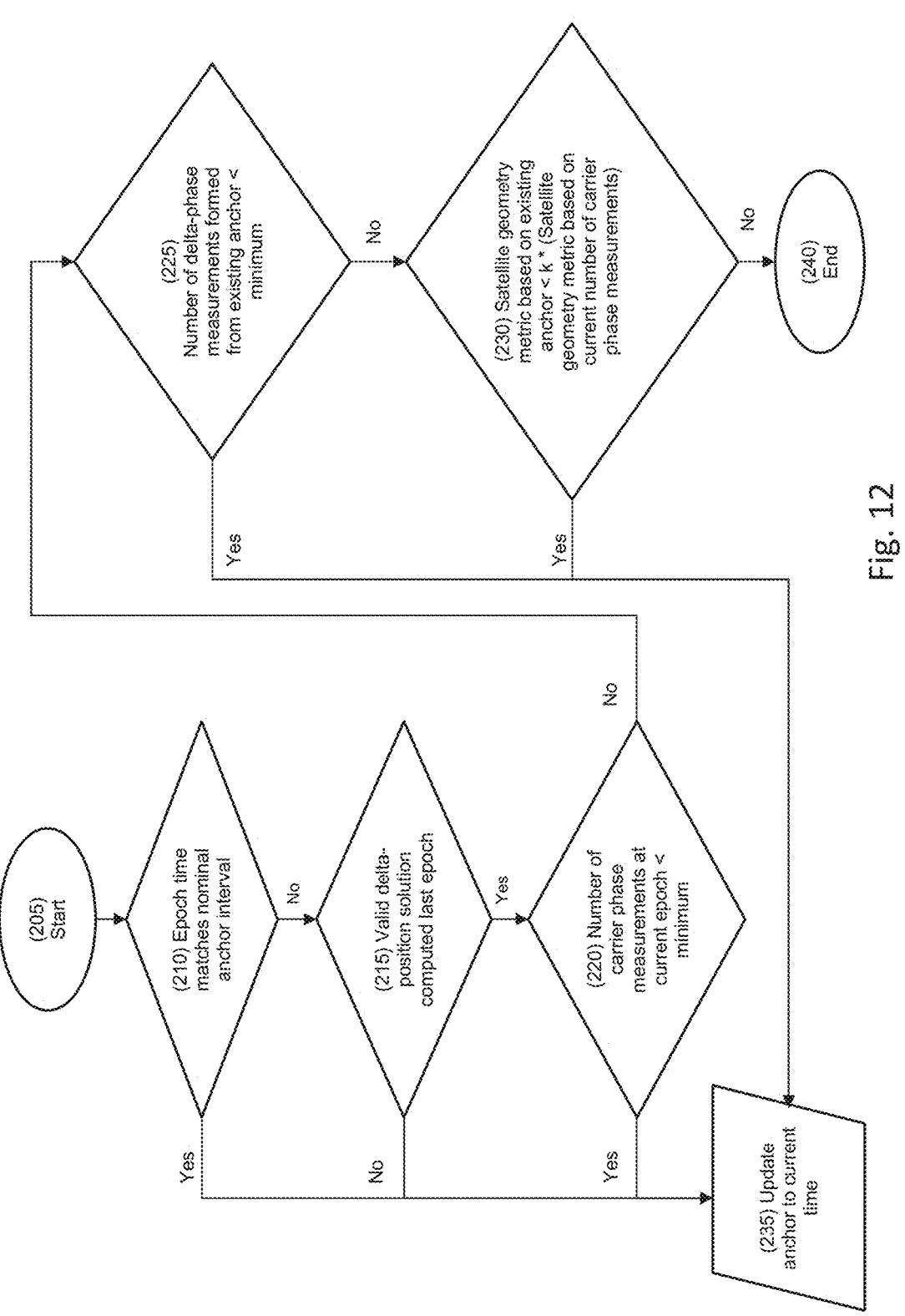
FIG. 12 is a flowchart of a method in one embodiment of the invention.

Some embodiments of the invention, which may collectively be referred to as the adaptive delta-phase anchor time setting approach, aim at balancing the solution availability and accuracy by actively varying the anchor epoch update interval according to the prevailing tracking conditions. FIG. 12 is a flowchart for an adaptive delta-phase anchor time setting method in one embodiment of the invention. The process is run prior to forming delta carrier phase measurements at the start of each new measurement epoch. During steady state operation, with the number of carrier phase measurements tracked being constant, the anchor time is revised (i.e., moved forward) at a nominal interval (say 5 s) as shown at 210 (this corresponds to step s15 as discussed with reference to FIG. 8). At 215, a check is made to see whether a valid delta-position solution was formed at the last epoch (this corresponds to sub-criterion A of step s20 as illustrated in FIGS. 9a, 9d, 9e, and 9g). If not, then the anchor time is set, i.e. the anchor epoch is moved forward (235) (this corresponds to step s25 as discussed notably with reference to FIGS. 3a, 3b, etc.). Typically, this test applies to (i.e., leads to the anchor epoch being moved forward for) the very first data epoch encountered, or immediately following a major interruption to satellite carrier phase tracking when delta-position solutions are discontinuous. Similarly, if the number of tracked carrier phase observations drops below the minimum required to form a solution (220) (this corresponds to sub-criterion B of step s20 as illustrated in FIGS. 9b, 9d, 9f, and 9g), then the anchor epoch is updated, i.e. the anchor epoch is moved forward (235) (this corresponds to step s25 as discussed with reference to FIGS. 3a, 3b, etc.). Likewise, if the number of delta-phase measurements that can be formed from the existing anchor epoch drops below the minimum (225) (this corresponds to sub-criterion C of step s20 as illustrated in FIGS. 3a, 3b, 9c, 9e, 9f, and 9g), the anchor epoch is revised, i.e. the anchor epoch is moved forward (235) (this, again, corresponds to step s25 as discussed with reference to FIGS. 3a, 3b, etc.).

At 230, the quality of the satellite measurement geometry based on the delta-phase measurements from the anchor epoch is compared with the satellite measurement geometry based on the current epoch carrier phase measurements (this corresponds to sub-criterion D of step s20 as illustrated in FIG. 10). If the measurement geometry is significantly worse for the anchor epoch, compared to the current epoch, the anchor is revised, i.e. the anchor epoch is moved forward (235) (this corresponds to step s25 as discussed with reference to FIGS. 3a, 3c, etc.). A constant k may be used to specify a significant change in the satellite measurement geometry.

In its simplest form, satellite measurement geometry may be based on the number of observations. For example:

number of delta−phase measurments based on the anchor epoch = 6;

number of carrier phase measurements at the current epoch = 9;

Constant $k = 0.75$;

Use new anchor since : $6 < (0.75*9 = 6.75)$

An alternative, albeit more computationally intensive metric for assessing satellite measurement geometry is the inverse geometric dilution of precision (GDOP). For example:

$(1/GDOP)$ based on delta−phase

-continued measurements based on anchor epoch $= (1/5.2 = 0.192)$;

$(1/GDOP)$ based on carrier phase measurements at the current epoch $= (1/2.4 = 0.417)$;

Constant $k = 0.75$;

Use new anchor since $: 0.192 < (0.75 * 0.417 = 0.313)$

An exemplary dataset was gathered for the purposes of demonstrating the relative merits of a preset (1 Hz) anchor epoch reference implementation and a realization of a method according to an embodiment of the invention. The real-time kinematic (RTK) dataset was logged at 10 Hz, with a multi-band, multi-system, survey-grade GNSS rover receiver, mounted to a vehicle. The vehicle was driven multiple times along a tree-lined road for a total period of approximately 70 minutes. The presence of tree canopy caused frequent interruptions to carrier phase tracking as well as diffraction errors on GNSS observations. Data collected in the field was processed in a real-time fashion using: a preset 1 Hz anchor epoch reference implementation and a realization of a method according to an embodiment of the invention.

Figure 13:
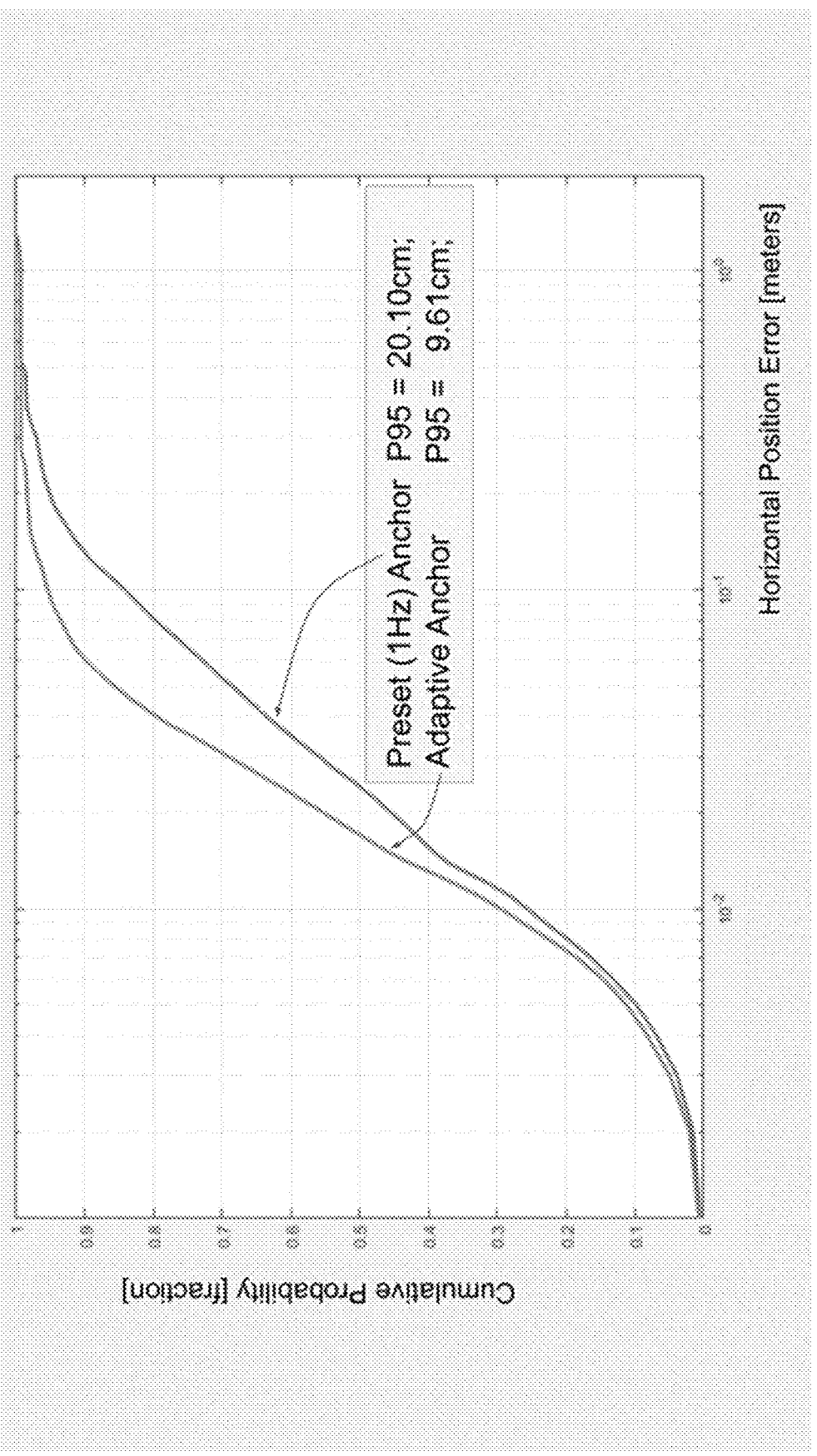
FIG. 13 shows a cumulative distribution function (CDF) of horizontal position errors for an exemplary dataset, to illustrate the benefits of some embodiments of the invention.

FIG. 13 illustrates the benefits gained in terms of horizontal positioning accuracy resulting from the adaptive delta-phase anchor time setting method in one embodiment of the invention compared to a fixed 1 Hz anchor of the preset anchor epoch reference implementation. The horizontal position errors are presented in terms of cumulative distribution functions. In this example, there is greater than a 2-fold improvement in the $95^{th}$-percentile (P95) horizontal position errors gained from using the adaptive delta-phase anchor time setting method and roughly a 2.5-fold improvement in the $68^{th}$-percentile horizontal position errors. The adaptive delta-phase anchor time setting approach uses a nominal 5 s-long anchor interval (i.e., a threshold time interval of 5 s) in this example.

In some embodiments, parallel processing tasks are performed. Hereinafter, the operations comprising steps s10, s20 (and conditionally s25), and s30 are regarded as forming a processing task, and the method in one embodiment comprises performing at least two processing tasks in parallel.

In one embodiment, each processing task comprises at least one of: its own initial value a, its own initial value b, its own criterion to decide whether to increase the value of a, its own time-differenced carrier phase observables computed by subtracting carrier phase observables associated with satellites from a specific NSS (the underlying advantage of this approach being to create some robustness against the failure of an entire satellite system), and its own time-differenced carrier phase observables computed by subtracting carrier phase observables associated with a specific combination of NSS frequencies.

Figure 14:
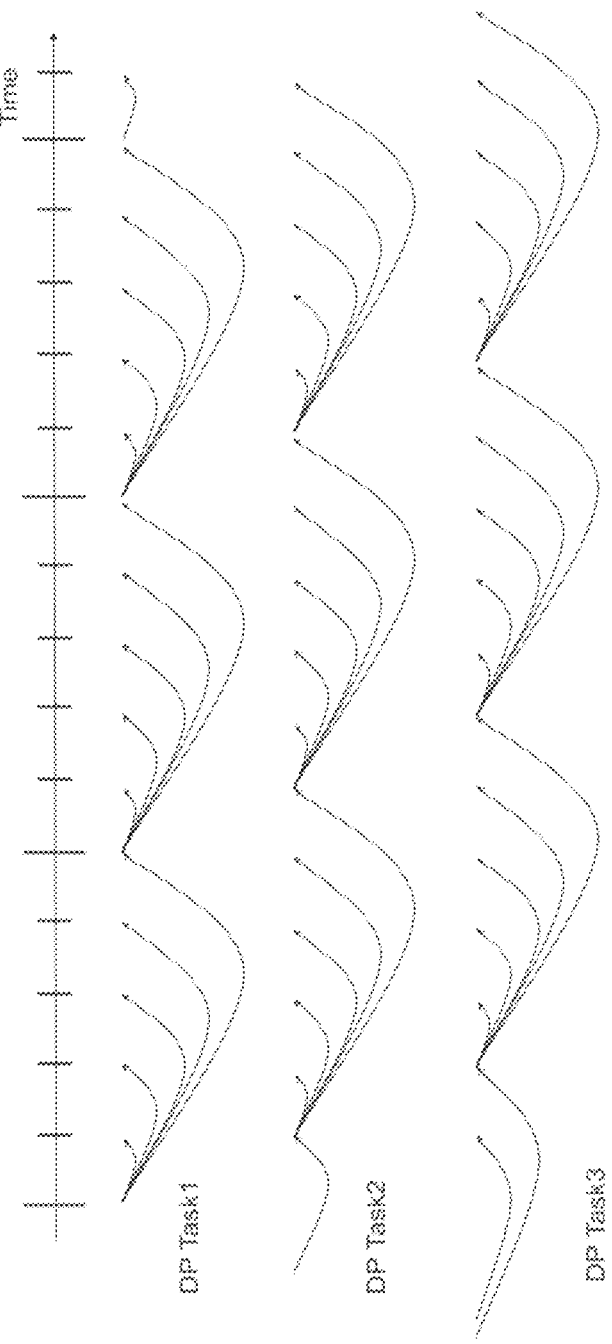
FIG. 14 illustrates the staggering of starting epochs of different delta-phase processing tasks in one embodiment of the invention.

Hence, the at least two processing tasks may perform respective computations and determinations independently from one another. Each of the at least two processing tasks may thus be executed on separate (virtual) compute units such as on separate CPU cores or CPU threads. Thus, the computational efficiency may be improved. Furthermore, each of the two or more processing tasks may be associated with a specific NSS and specific combination of NSS frequencies. For example, a first processing task may observe NSS signals from GPS satellites and the second processing task may observe NSS signals from Galileo satellites. In another example, both the first processing task and the second processing task may observe NSS signals from GPS satellites, wherein the NSS signals observed by the first processing task are on the L1 frequency band and the NSS signals observed by the second processing are on the L2 frequency band. In a further example, there may be two processing tasks, one with a threshold time interval of 1 s, the other with a threshold time interval of 10 s. In yet a further example, the starting epochs of different delta-phase processing tasks may be staggered, as illustrated in FIG. 14 (in which "DP" stands for "delta processing"). In yet another exemplary approach, the processing tasks may be separated in terms of different combinations of GNSS tracking bands, e.g. having an L1-specific task, an ionosphere-free task, and a narrow-lane combination task.

In one embodiment, the method may further comprise processing outputs of the at least two processing tasks by at least one of: (a) comparing the outputs of the processing tasks and selecting one of the outputs to exclude outliers, wherein, preferably, this is carried out for at least three processing tasks using a majority voting approach to exclude outliers; (b) forming a weighted mean combination of parameter estimates, where a weighting factor used for the weighted mean is determined from formal precisions of the parameter estimates; and (c) selecting parameter estimates from the processing task that produced the best precisions (obtained from the covariance matrix). In such a manner, the precision of the delta-carrier-phase observables may be further improved and/or the situation in which many NSS satellites are available may advantageously be dealt with.

System

Figure 15:
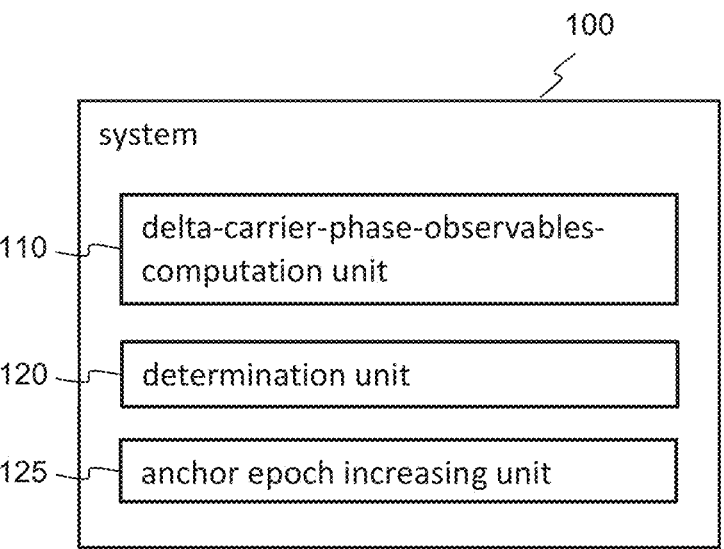
FIG. 15 schematically illustrates a system in one embodiment of the invention.

FIG. 15 schematically illustrates a system 100 in one embodiment of the invention. System 100 comprises an NSS receiver and/or a processing entity capable of receiving data from the NSS receiver. The system operates to estimate parameters derived from NSS signals useful to, i.e. suitable to, determine a position. The NSS receiver is configured for observing at least one NSS signal from each of a plurality of NSS satellites over multiple epochs. System 100 comprises delta-carrier-phase-observables-computation unit 110, a determination unit 120, and an anchor epoch increasing unit 125.

Delta-carrier-phase-observables-computation unit 110 is configured for performing delta-carrier-phase-observables-computation procedure$_{a,b}$ or delta-carrier-phase-observables-computation procedure$_{a,b+u}$, as described above. Determination unit 120 is configured for determining whether a criterion indicative of at least one of (i) continuity of carrier phase measurements from epoch a to epoch b+u, and (ii) stability of NSS satellite measurement geometry from epoch a to epoch b+u, is satisfied, as described above. Further, anchor epoch increasing unit 125 is configured for increasing the value of a if the above-referred criterion is not satisfied, as described above.

In one embodiment, a vehicle comprises a system 100 as described above. The vehicle may for example be an autonomous vehicle such as a self-driving vehicle, a driverless vehicle, a robotic vehicle, a highly automated vehicle, a partially automated vehicle, an aircraft, or an unmanned aerial vehicle. The vehicle may for example be a car, a truck, a bus, a motorcycle, a tractor, a combine harvester, a crop sprayer, a construction equipment, a grader, or a train. Exemplary applications may include machine guidance, construction work, operation of unmanned aerial vehicles (UAV), also known as drones, and operation of unmanned surface vehicles/vessels (USV).

ADDITIONAL REMARKS

Any of the above-described methods and their embodiments may be implemented, at least partially, by means of a computer program or a set of computer programs. The computer program(s) may be loaded on an apparatus, such as for example an NSS receiver (running on a rover station, on a reference station, or within a vehicle) or a server (which may comprise one or a plurality of computers). Therefore, the invention also relates, in some embodiments, to a computer program or set of computer programs, which, when carried out on an apparatus as described above, such as for example an NSS receiver (running on a rover station, on a reference station, or within a vehicle) or a server, carries out any one of the above-described methods and their embodiments.

The invention also relates, in some embodiments, to a computer-readable medium or a computer-program product including the above-mentioned computer program. The computer-readable medium or computer-program product may for instance be a magnetic tape, an optical memory disk, a magnetic disk, a magneto-optical disk, an SSD, a CD-ROM, a DVD, a CD, a flash memory unit, or the like, wherein the computer program is permanently or temporarily stored. In some embodiments, a computer-readable medium (or to a computer-program product) has computer-executable instructions for carrying out any one of the methods of the invention.

In one embodiment, a computer program as claimed may be delivered to the field as a computer program product, for example through a firmware or software update to be installed on receivers already in the field. This applies to each of the above-described methods and apparatuses.

NSS receivers may include one or more antennas, configured to receive the signals at the frequencies broadcasted by the satellites, processor units, one or a plurality of accurate clocks (such as crystal oscillators), one or a plurality of central processing units (CPU), one or a plurality of memory units (RAM, ROM, flash memory, or the like), and a display for displaying position information to a user.

Where the terms "delta-carrier-phase-observables-computation unit", "determination unit", "anchor epoch increasing unit", and the like are used herein as units (or sub-units) of an apparatus (such as an NSS receiver), no restriction is made regarding how distributed the constituent parts of a unit (or sub-unit) may be. That is, the constituent parts of a unit (or sub-unit) may be distributed in different software or hardware components or devices for bringing about the intended function. Further, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding and are not intended to limit the scope of the invention. The scope of the invention is defined by the appended claims.

Abbreviations

AltBOC alternative BOC (modulation)
BDS BeiDou Navigation Satellite System

BOC binary offset carrier (modulation)
C/A coarse/acquisition (code)
CDF cumulative distribution function
CPU central processing unit
Eq. equation
GDOP geometric dilution of precision
GNSS global navigation satellite system
GPS Global Positioning System
I/O input/output
IP Internet Protocol
LMS least mean squares
NAVIC NAVigation with Indian Constellation
NCO numerically controlled oscillator
NSS navigation satellite system
PPP precise point positioning
PRN pseudo-random noise
QZSS Quasi-Zenith Satellite System
RAM random-access memory
RNSS regional navigation satellite system
ROM read-only memory
RTK real-time kinematic
s second
Sat satellite

REFERENCES

[1] Hofmann-Wellenhof, B., et al., "GNSS, Global Navigation Satellite Systems, GPS, GLONASS, Galileo, & more", Springer-Verlag Wien, 2008.

[2] WO 2012/151006 A1 (application number: PCT/US2012/029694) titled "GNSS Signal Processing with Delta Phase" (Trimble ref.: TNL A-2705PCT).

[3] Jan Van Sickle, "Two Types of Observables| GEOG 862: GPS and GNSS for Geospatial Professionals", John A. Dutton e-Education Institute, College of Earth and Mineral Sciences, The Pennsylvania State University, retrieved from https://www.e-education.psu.edu/geog862/node/1752 on Nov. 8, 2021.

[4] EP 3 035 080 A1 titled "Navigation satellite system positioning involving the generation of correction information" (Trimble ref.: A4396).

[5] EP 3 130 943 A1 titled "Navigation satellite system positioning involving the generation of tropospheric correction information" (Trimble ref.: 15072-EPO).

[6] Maronna, R. A., Martin, R. D., Yohai, V. J. 2006, Robust Statistics, Theory and Methods, John Wiley & Sons, West Sussex, England, ISBN: 0-470-01092-4.

[7] Brown, R. G. & Hwang, P. Y. C. 1997, Introduction to random signals and applied Kalman filtering: with MATLAB exercise and solutions, 3rd Ed. John Wiley & Sons, New York, ISBN: 0-471-12839-2.

[8] Enge, P. & Misra, P. 2001, Global Positioning System, Signals, Measurements, and Performance, Ganga-Jamuna Press, ISBN: 0-9709544-0-9.

The invention claimed is:

1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing NSS signals from NSS satellites, wherein, hereinafter, a procedure comprising computing time-differenced carrier phase observables by subtracting carrier phase observables of an epoch m from carrier phase observables of a subsequent epoch n is referred to as "delta-carrier-phase-observables-computation procedure$_{m,n}$"; and wherein, hereinafter, u is a measurement update interval; the method comprising:

receiving the NSS signals at the NSS receiver;

performing delta-carrier-phase-observables-computation procedure$_{a,b}$ based on the NSS signals;

determining that a criterion indicative of stability of NSS satellite measurement geometry from epoch a to epoch b+u, is not satisfied, and increasing the value of a;

performing delta-carrier-phase-observables-computation procedure$_{a,b+u}$, and determining a positioning solution of the NSS receiver at least based on the time-differenced carrier phase observables computed in the delta-carrier-phase-observables-computation procedure$_{a,b+u}$.

2. Method of claim 1, wherein measurement update interval u has a value that is larger than, or equal to, 0.1 second and smaller than, or equal to, 10 seconds, preferably a value that is larger than, or equal to, 0.1 second and smaller than, or equal to, 2 seconds, more preferably a value that is larger than, or equal to, 0.15 second and smaller than, or equal to, 0.5 second.

3. Method of claim 1, further comprising, after performing delta-carrier-phase-observables computation procedure$_{a,b}$ and before performing delta-carrier-phase-observables computation procedure$_{a,b+u}$, determining whether b+u minus a is larger than, or equal to, a threshold time interval, and, if so, increasing the value of a regardless of whether the criterion is satisfied;

wherein the threshold time interval has a value that is larger than twice the measurement update interval u.

4. Method of claim 3, wherein the threshold time interval has a value that is smaller than, or equal to, 200 times the measurement update interval u, preferably a value that is larger than, or equal to, 3 times the measurement update interval u and smaller than, or equal to, 100 times the measurement update interval u, more preferably a value that is larger than, or equal to, 4 times the measurement update interval u and smaller than, or equal to, 50 times the measurement update interval u.

5. Method according to claim 1, wherein determining whether the criterion is satisfied comprises:

determining whether a measure of quality of the NSS satellite measurement geometry at epoch a, said measure of quality being hereinafter referred to as "measure$_a$", is not significantly worse than a measure of quality of the NSS satellite measurement geometry at epoch b+u, said measure of quality being hereinafter referred to as "measure$_{b+u}$", and wherein determining whether measure$_a$ is not significantly worse than measure$_{b+u}$ comprises:

determining whether measure$_a$ is larger than, or equal to, k times measure$_{b+u}$, where k is a number larger than 0 and smaller than 1, a number larger than 0.4 and smaller than 0.9, or a number larger than 0.6 and smaller than 0.8.

6. Method of claim 5, wherein measured is the number of time-differenced carrier phase observables computed when delta-carrier-phase-observables-computation procedure$_{a,b}$ was performed and measure$_{b+u}$ is the number of available carrier phase observables at epoch b+u.

7. Method of claim 5, wherein measure$_a$ is an inverse geometric dilution of precision based on the time-differenced carrier phase observables computed when delta-carrier-phase-observables-computation procedure$_{a,b}$ was performed and measure$_{b+u}$ is an inverse geometric dilution of precision based on the available carrier phase observables at epoch b+u.

8. Method according to claim 1, further comprising, after performing delta-carrier-phase-observables-computation procedure$_{a,b+u}$, at least one occurrence of the following operations, with the value of b being incremented by u before each occurrence:

determining whether the criterion is satisfied, and, if not, increasing the value of a; and performing delta-carrier-phase-observables-computation procedure$_{a,b+u}$.

9. Method of claim 8, wherein, hereinafter, the operations comprising:

performing delta-carrier-phase-observables-computation procedure$_{a,b}$;

determining whether the criterion is satisfied, and, if not, increasing the value of a; and performing delta-carrier-phase-observables-computation procedure$_{a,b+u}$;

are regarded as forming a processing task, wherein the method comprises performing at least two processing tasks in parallel, and wherein each processing task comprises at least one of:

its own initial value a;

its own initial value b;

its own criterion to decide whether to increase the value of a;

its own time-differenced carrier phase observables computed by subtracting carrier phase observables associated with satellites from a specific NSS; and its own time-differenced carrier phase observables computed by subtracting carrier phase observables associated with a specific combination of NSS frequencies.

10. Method of claim 9, further comprising processing outputs of the at least two processing tasks by at least one of:

comparing the outputs of the processing tasks and selecting one of the outputs to exclude outliers, wherein, preferably, this is carried out for at least three processing tasks using a majority voting approach to exclude outliers;

forming a weighted mean combination of parameter estimates, where a weighting factor used for the weighted mean is determined from formal precisions of the parameter estimates; and, selecting parameter estimates from the processing task that produced the best precisions.

11. Method according to claim 1, wherein, in the definition of delta-carrier-phase-observables-computation procedure$_{m,n}$, the term "subsequent" means "following in time".

12. Method according to claim 1, wherein, in the definition of delta-carrier-phase-observables-computation procedure$_{m,n}$, the term "subsequent" means "following in order";

the method is carried out at least partially in a post-processing manner; and the epochs are ordered in reverse time at least for the purpose of performing delta-carrier-phase-observables-computation procedure$_{a,b}$;

determining whether the criterion is satisfied, and, if not, increasing the value of a; and performing delta-carrier-phase-observables-computation procedure$_{a,b+u}$.

13. A non-transitory computer readable program or programs storing instructions that when executed by a processor causes the processor to carry out the method according claim 1.

14. System comprising at least one of a navigation satellite system receiver, hereinafter abbreviated as "NSS receiver", and a processing entity capable of receiving data from the NSS receiver, the system being for estimating parameters useful to determine a position, the NSS receiver observing NSS signals from NSS satellites, wherein, hereinafter, a procedure comprising computing time-differenced carrier phase observables by subtracting carrier phase observables of an epoch m from carrier phase observables of a subsequent epoch n is referred to as "delta-carrier-phase-observables-computation procedure$_{m,n}$"; and wherein, hereinafter, u is a measurement update interval; and the system being configured for performing steps comprising:

performing delta-carrier-phase-observables-computation procedure$_{a,b}$;

determining that a criterion indicative of stability of NSS satellite measurement geometry from epoch a to epoch b+u, is not satisfied, and increasing the value of a;

performing delta-carrier-phase-observables-computation procedure$_{a,b+u}$, and determining a positioning solution of the NSS receiver at least based on the time-differenced carrier phase observables computed in the delta-carrier-phase-observables-computation procedure$_{a,b+u}$.

15. Vehicle comprising a system according to claim 14, the vehicle preferably being at least one of: a motor vehicle, an agricultural tractor, a combine harvester, a crop sprayer, a construction equipment, a truck, a bus, a train, a motorcycle, an autonomous vehicle, a self-driving vehicle, a driverless vehicle, a robotic vehicle, a highly automated vehicle, an aircraft, and an unmanned aerial vehicle.

16. System according to claim 14, wherein the criterion is further indicative of continuity of carrier phase measurements from epoch a to epoch b+u.

17. Method according to claim 16, wherein determining whether the criterion is satisfied comprises at least one of:

determining whether the number of time-differenced carrier phase observables computed when delta-carrier-phase-observables-computation procedure$_{a,b}$ was performed is larger than, or equal to, a threshold, hereinafter referred to as "minimum-number-of-delta-carrier-phase-observables threshold";

determining whether the number of available carrier phase observables at epoch b+u is larger than, or equal to, a threshold, hereinafter referred to as "minimum-number-of-carrier-phase-observables threshold"; and determining whether the number of time-differenced carrier phase observables that is still computable in delta-carrier-phase-observables-computation procedure$_{a,b+u}$ with the current value of a is larger than, or equal to, a threshold, hereinafter referred to as "minimum-number-of-still-computable-delta-carrier-phase-observables threshold".

18. Method of claim 17, wherein the minimum-number-of-delta-carrier-phase-observables threshold is equal to 4.

19. Method of claim 17, wherein the minimum-number-of-carrier-phase-observables threshold is a minimum number of available carrier phase observables required to form a positioning solution using an estimation process, hereinafter referred to as "estimator", wherein the estimator uses state variables and computes the values of its state variables at least based on the time-differenced carrier phase observables computed in delta-carrier-phase-observables-computation procedure$_{m,n}$.

20. Method according to claim 17, wherein the minimum-number-of-still-computable-delta-carrier-phase-observables threshold is equal to, or larger than, 4.

* * * * *